United States Patent [19]

Hetzler

[11] Patent Number: 5,682,273
[45] Date of Patent: Oct. 28, 1997

[54] DISK DRIVE FOR PORTABLE COMPUTER WITH ADAPTIVE DEMAND-DRIVEN POWER MANAGEMENT

[75] Inventor: Steven Robert Hetzler, Sunnyvale, Calif.

[73] Assignee: International Business Machines Corporation, Armonk, N.Y.

[21] Appl. No.: 532,956

[22] Filed: Sep. 22, 1995

Related U.S. Application Data

[63] Continuation-in-part of Ser. No. 497,099, Jun. 30, 1995, abandoned.

[51] Int. Cl.$^6$ .......................... G11B 15/00; G11B 15/02
[52] U.S. Cl. .......................... 360/75; 360/71; 360/69; 360/73.03; 395/750; 369/54
[58] Field of Search .......................... 360/69, 75, 71, 360/70, 73.03, 97.01, 751; 395/750, 735, 759; 369/54

[56] References Cited

U.S. PATENT DOCUMENTS

| | | | |
|---|---|---|---|
| 4,146,923 | 3/1979 | Borkan | 364/483 |
| 4,161,002 | 7/1979 | Saito | 360/75 |
| 4,250,413 | 2/1981 | Kawasaki et al. | 307/293 |
| 4,269,496 | 5/1981 | Motoori et al. | 354/267 |
| 4,376,293 | 3/1983 | Teramura et al. | 360/71 |
| 4,635,145 | 1/1987 | Horie et al. | 360/78 |

(List continued on next page.)

FOREIGN PATENT DOCUMENTS

| | | | |
|---|---|---|---|
| 62-262265 | 11/1987 | Japan | G11B 19/02 |
| 63-224078 | 9/1988 | Japan | G11B 20/10 |
| 1-013253 | 1/1989 | Japan | G11B 19/00 |
| 2-306483 | 12/1990 | Japan | G11B 21/12 |
| 3-186073 | 8/1991 | Japan | H04N 5/225 |
| 3-201261 | 9/1991 | Japan | G11B 19/00 |
| 4-102261 | 4/1992 | Japan | G11B 19/20 |

OTHER PUBLICATIONS

S. Boxer, "Hitting the High Note", PC User, No. 204, Feb. 10-23, 1993, p. 63.

F. Douglis et al., "Adaptive Disk Spin-down Policies for Mobile Computers", 2nd USENIX Symposium on Mobile and Location-independent Computing Proceedings, Apr. 10-11, 1995, pp. 1-19.

(List continued on next page.)

*Primary Examiner*—Aristotelis M. Psitos
*Assistant Examiner*—Kin Wong
*Attorney, Agent, or Firm*—Thomas R. Berthold

[57] ABSTRACT

A data recording disk drive for use in a portable, battery-powered computer has several power-save modes of operation. The power-save modes are entered after a computed time since the last data read or write command. The computed time to enter a power-save mode is based on the computer user's real-time workload and is thus continuously varying during operation of the disk drive. The disk drive detects the current user workload by calculating the frequency of disk drive accesses and based on this history determines which of a plurality of power-save modes is appropriate and when to enter a power-save mode. Each disk drive read or write access is detected and used to compute a current access frequency. The current access frequency is compared to a previously calculated and continuously updated threshold frequency. The threshold frequency is representative of the access pattern, e.g., uniform or sporadic, and is computed from equations that include adjustable gain factors. The appropriate power-save mode is entered when the current access frequency falls below the threshold frequency. Intermediate power-save modes can be skipped, based on the detected access pattern. The disk drive can also adapt dynamically to varying workload situations, thereby saving more energy without degrading performance. This is accomplished by adjusting the gain factors in response to tracking the actual performance of the system, thereby changing the threshold frequency. The disk drive also determines when to exit a power-save mode without necessarily waiting for a user access.

28 Claims, 11 Drawing Sheets

U.S. PATENT DOCUMENTS

| | | | |
|---|---|---|---|
| 4,649,373 | 3/1987 | Bland et al. | 340/365 R |
| 4,684,864 | 8/1987 | Morimoto | 318/696 |
| 4,700,243 | 10/1987 | Tsuyuguchi et al. | 360/69 |
| 4,717,968 | 1/1988 | Painton et al. | 358/310 |
| 4,783,706 | 11/1988 | Shoji et al. | 360/78 |
| 4,933,785 | 6/1990 | Morehouse et al. | 360/78.04 |
| 4,980,836 | 12/1990 | Carter et al. | 364/483 |
| 4,991,129 | 2/1991 | Swartz | 364/707 |
| 5,005,088 | 4/1991 | Fukushima et al. | 360/69 |
| 5,153,837 | 10/1992 | Shaffer et al. | 364/464.04 |
| 5,185,734 | 2/1993 | Call et al. | 369/116 |
| 5,345,347 | 9/1994 | Hopkins et al. | 360/71 |
| 5,402,200 | 3/1995 | Shrinkle et al. | 360/69 |
| 5,412,809 | 5/1995 | Tam et al. | 395/750 |
| 5,442,608 | 8/1995 | Umeda et al. | 369/44.27 |
| 5,452,277 | 9/1995 | Bajorek et al. | 369/54 |
| 5,469,553 | 11/1995 | Patrick | 395/750 |
| 5,471,353 | 11/1995 | Codilian et al. | 360/73.03 |
| 5,481,733 | 1/1996 | Douglis et al. | 395/750 |
| 5,493,670 | 2/1996 | Douglis | 395/750 |
| 5,517,649 | 5/1996 | McLean | 395/750 |

OTHER PUBLICATIONS

M. Druffin et al., "Hard and Soft Disk/Diskette Drives Powering Under Control of Microcode to Reduce Drive Failures", IBM Technical Disclosure Bulletin, vol. 31, No. 1, Jun. 1988, pp. 485–486.

N. Georgas, "LiteDrive", PC Magazine, vol. 6, No. 16, Sep. 29, 1987, p. 244.

P. M. Greenwalt, "Modeling Power Management for Hard Disks", MASCOTS '94, Proc. of the 2nd International Workshop on Modeling, Anslysis, and Simulation of Computer and Telecommunication Systems, 1994, pp. 62–66.

E. P. Harris et al., "Technology Directions for Portable Computers", Proc. of the IEEE, vol. 83, No. 4, Apr. 1995, pp. 636–658.

IBM Announcement, "IBM TravelStar Disk Drives Extend Battery Life for Mobile Computer Users", Aug. 15, 1995.

W. F. Klostermeyer et al., "Reducing Disk Power Consumption in a Portable Computer", Operating Systems Review, vol. 29, No. 2, Apr. 1995, pp. 27–32.

F. Douglis et al., "Thwarting the Power–hungry Disk", Proc. of the Winter 1994 USENIX Conference, Jan. 17–21, 1994, pp. 293–306.

K. Li et al., "A Quantitative Analysis of Disk Drive Power Management in Portable Computers", Proc. of the Winter 1994 USENIX Conference, Jan. 17–21, 1994, pp. 279–291.

R. C. Schwartz, "Method to Provide Low Power Standby Mode for Online Devices", IBM Technical Disclosure Bulletin, vol. 29, No. 11, Apr. 1987, p. 4763.

5,682,273

DISK DRIVE FOR PORTABLE COMPUTER WITH ADAPTIVE DEMAND-DRIVEN POWER MANAGEMENT

This application is a continuation-in-part of application Ser. No. 08/497,099, filed on Jun. 30, 1995 now abandoned.

TECHNICAL FIELD

This invention relates in general to disk drives used in portable computers, such as laptop or notebook computers, that are battery powered. In particular, the invention relates to such disk drives that include techniques for minimizing energy consumption.

BACKGROUND OF THE INVENTION

Portable computers can only function for several hours before draining their battery sources. A major power user is the hard disk drive. The primary power management technique for the hard disk drive in portable computers is the use of several reduced-power or power-save operating modes, each mode being entered following time out of a fixed predetermined time period since a disk drive read or write operation. For example, at the end of a fixed time period since the user last wrote data to the hard disk, the read/write heads are moved to their parking location and the disk drive spindle motor is shut off. When the user next accesses the disk drive, the spindle motor is spun up and the heads are moved across the disk to read or write data on the appropriate data track. The primary disadvantage of such a power-save mode is the time delay in exiting the mode, during which the user must wait. This greatly affects the performance of the computer. Typically, the lengths of the fixed time periods are set by the computer user through software.

The problem with this prior power-save technique is that no user has the necessary data to choose a good fixed time period. The user has only limited knowledge of access patterns, and no real information on the energy and performance parameters for the disk drive. The user is isolated from the disk drive access pattern by the hardware and software in the system. Fixed times for entering power-save modes are a poor tradeoff between energy and performance since there is no allowance for the user workload. The user must change the fixed times in anticipation of the workload, and the selection of times too short or too long can adversely impact performance and energy consumption.

Short mode entry times save energy when the access pattern has bursts of activity followed by long periods of inactivity. However, excess energy is used when the inactive periods are close to the mode entry time. Performance may also be impacted since the modes are entered after short periods of inactivity, typically resulting in more frequent access delays due to mode recovery times.

Long mode entry times reduce the impact on computer performance and are less prone to use excess energy, assuming that longer inactive periods are less common than shorter inactive periods. However, they use extra energy while waiting to enter the power-save mode.

During a particular user workload, it is quite probable that the optimum time will not be constant. Further, the workload may change without the user being aware of it since it may be due to the behavior of application software the user is running.

The user really wants to choose between energy consumption and computer performance, not between fixed mode entry times. The user's choice of fixed mode entry times is merely a guess at achieving some energy or performance goal. It is clearly preferable for the disk drive to receive the user's energy and performance goals as inputs. With these goals, the disk drive may then take whatever measures are appropriate to meet them. This also permits the use of many more power-save modes since the user need not be aware of the specific power-save modes in the drive if the user is no longer selecting a fixed time for each mode entry.

What is needed is a disk drive method and system for achieving power management that can detect and adapt to changing workloads, and that can use energy and performance goals, instead of fixed times, to determine when to enter and exit power-save modes.

SUMMARY OF THE INVENTION

The disk drive of the present invention perform power management from past disk drive access history and a prediction of future user demands to determine the power-save mode entry and exit times. This has the advantage over the current user-selectable predetermined or fixed mode-entry times since the user does not know what performance and energy-consumption costs are associated with entry and exit from the power-save modes. The disk drive has information on the energy break-even times and recovery times associated with the power-save modes. The energy break-even time is the time the drive needs to remain in the particular power-save mode so that the extra energy consumed during recovery from that mode balances the reduced energy consumption while in that mode. The recovery time is the amount of time it takes the disk drive to return from a power-save mode to the active state. The disk drive keeps track of the access patterns, i.e., the history of requests to read or write data and/or move the actuator. The disk drive thus detects the current user workload and determines which of a plurality of power-save modes is appropriate and when to enter a mode. In the preferred embodiment each disk drive access is detected and used to compute a current access frequency. The current access frequency is compared to a previously calculated and continuously updated threshold frequency. The threshold frequency is representative of the access pattern, e.g., uniform or sporadic, and is computed from equations that include adjustable gain factors. During operation of the disk drive the appropriate power-save mode is entered when the current access frequency falls below the threshold frequency. Intermediate power-save modes can be skipped, based on the detected access pattern. The disk drive can also adapt dynamically to varying workload situations, thereby saving more energy without degrading performance. This is accomplished by adjusting the gain factors in response to tracking the actual performance of the system, thereby changing the threshold frequency. The disk drive also determines when to exit a power-save mode without necessarily waiting for a user access. In the present invention, there can thus be many power-save modes that would otherwise be impractical for a user to keep track of. The power-save modes can also be customized for different disk drive products without the need to conform to some standard for setting fixed times, or number of power-save modes. New user-selectable parameters, such as on/off, performance, and energy targets can be used to replace fixed mode-entry times. These parameters adjust the gain factors and thus the threshold frequency. This alters the equations used to determine when to enter a power-save mode.

For a fuller understanding of the nature and the advantages of the present invention, reference should be made to the following detailed description taken in conjunction with the accompanying figures.

DETAILED DESCRIPTION OF THE INVENTION

Disk Drive System

Figure 1:
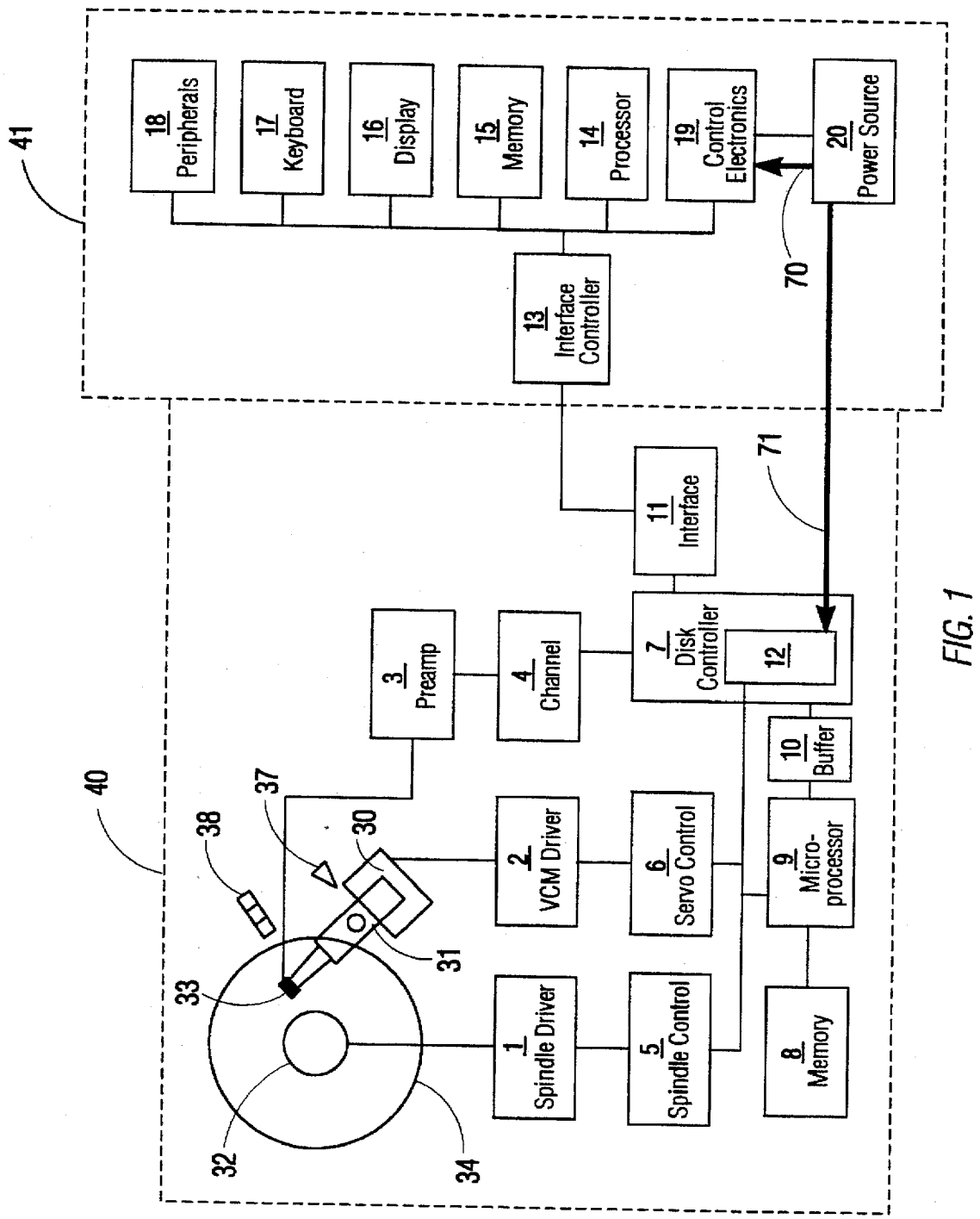
FIG. 1 is a block diagram of the disk drive and computer system illustrating the power source and the various energy-consuming disk drive components.

FIG. 1 is a block diagram showing the various elements in power management for the disk drive of the present invention. The disk drive 40 is typically a hard disk drive contained within the housing of a laptop computer, such as computer 41. The disk drive 40 contains one or more disks, such as typical disk 34, attached to and rotated by spindle motor 32. A data head 33 is connected to an actuator 31 that is typically operated by a rotary voice coil motor (VCM) 30. Spindle motor 32 is driven by spindle driver 1 and spindle control electronics 5. Servo control electronics 6 is used to position the head 33 over the various data tracks of disk 33 and is connected to VCM driver 2, which supplies current to the VCM 30. Also shown in FIG. 1 are a crash stop 37 for actuator 31 and a load/unload (L/UL) ramp 38. If the disk drive 40 is the contact start/stop (CSS) type wherein the head 33 resides on disk 34 when the spindle motor is not rotating, then the actuator is driven to the crash stop 37 by current to VCM 30 so that the head 33 can come to rest on a nondata landing zone near the disk inside diameter (ID). If the disk drive 40 is the L/UL type, then at spindle motor shutdown the actuator 31 is driven so that the suspension supporting the head 33 rides up the ramp 38 and unloads the head 33 from contact with the disk. The ID landing zone for a CSS disk drive and the ramp for a L/UL disk drive are often referred to as head-parking locations.

Data head 33 reads and writes user data on disk 34, and is typically a thin film inductive (TFI) read/write head or a TFI write head with a magnetoresistive (MR) read head. Data head 33 is connected to preamplifier and write driver 3, data recording channel 4, and disk controller electronics 7. Data recording channel 4 may be any type, such as peak detector or partial-response maximum likelihood (PRML), and includes such functions as data detection, encoding and decoding. Disk controller 7, in connection with microprocessor 9, handles the processes of reading and writing data, coordinates communications with computer 41, manages buffer memory 10, and directs servo control electronics 6 and spindle control electronics 5.

Disk drive 40 also includes a microprocessor 9 and associated memory 8, buffer memory 10, interface module 11, and a power control module 12. Microprocessor memory 8 is used to store code and data for microprocessor 9. Buffer memory 10 is used to store data being transferred from the computer 41 to the disk drive 40, and is typically configured as a cache memory. Interface module 11 controls the transmission of information over the interface from computer interface controller 13. The integrated drive electronics (IDE) interface and small computer system interface (SCSI) are the most common type of interfaces.

All of the components of disk drive 40 shown in FIG. 1 require power to operate. Power control module 12 controls the power management of the disk drive 40, which receives power from power source 20 via bus 71. The power connection to all of the components is not shown in FIG. 1, but each of them receives power either directly off bus 71 or through another component. The power control module 12 may be physically contained as logic circuitry within controller 7, and/or be in the form of microcode stored in memory 8 for execution by microprocessor 9. The power lines from power source 20 to each of the energy-consuming components can be directly controlled by module 12 or the output of microprocessor 9, or commands can be issued to the components to turn off, turn on and/or otherwise change their power state.

The connections between the various components of disk drive 40 have been shown schematically in FIG. 1, but the functions may be achieved with other arrangements. For example, microprocessor memory 8 may be contained within the microprocessor 9, or combined with buffer memory 10. Additionally, it is common to have more than one microprocessor in a disk drive with one microprocessor used mainly for interface and drive management functions, and the other used for servo functions. In such a case, the servo control electronics 6 may include a separate servo microprocessor.

Computer 41 comprises interface controller 13, processor 14, memory 15, display 16, keyboard 17, and/or other input devices, peripherals 18, power source 20, and control electronics 19. Interface controller 13 handles communication with disk drive 40. Power source 20 is the power source for computer 41 and disk drive 40. For portable applications this is typically a rechargeable battery, although it may be any other type of power source, such as an A/C power supply. Power source 20 provides power to the various components in the computer 41 through bus 70 and to the disk drive 40 through bus 71. Power source 20 also communicates with control electronics 19. For example, the batteries in portable computers contain internal control electronics that monitor the battery status, such as the discharge state.

Disk Drive Power Management

The disk drive 40 does not consume energy at a constant rate. More energy is consumed when seeking (i.e., movement of the head 33 across the data tracks of disk 34 by application of current to VCM 30) than when track following (i.e., maintaining of the head 33 on a single data track by intermittent current pulses to VCM 30). Also, additional energy is consumed during write operations because write current is applied to the coil of the TFI head. These disk drive accesses result in the identification of two active power modes: the seek/read/write power mode and the idle power mode. The seek/read/write power mode is typically an estimate since it is based on an assumption of the user workload. The idle power mode is the normal track-following operation when data is not being read or written, and no seek is occurring. The term active state is used to refer to the disk drive when it is in either the seek/read/write or the idle power modes.

The two common power-save modes are referred to as idle2 and standby. In the idle2 mode, the actuator 31 is parked (i.e., moved to crash stop 30 or unloaded onto ramp 37), and the servo control electronics 6 and read/write electronics, including preamplifier 3 and channel 4, are turned off. The idle2 mode thus substantially reduces or removes power to VCM driver 2, servo control electronics 6, preamplifier 3 and channel 4. In the idle2 power-save mode, it is also possible to reduce power to disk controller 7 and microprocessor 9 because the servo and read/write tasks are not active. In the standby mode, the actuator 31 is moved to its parking location and the spindle motor 32 is turned off. The standby power-save mode has all the power savings of idle2, plus the additional reduction in power to spindle control electronics 5 and spindle driver 1. In some implementations, buffer 10 may also be turned off in one or both of the idle2 and standby modes. Additional power-save modes are also possible. For example, the sleep mode includes the power-save features of standby and also has almost all remaining electronics turned off, leaving powered on only a portion of the interface controller 11 and whatever else is necessary to respond to a sleep recovery command from computer interface controller 13.

Table 1 shows the power values for a typical 2.5-inch disk drive for the two active modes and the two power-save modes described above. From this table, it is clear that the power-save modes, idle2 and standby, provide substantial reductions in energy consumption.

TABLE 1

Power Values for a 2.5-inch Disk Drive

| Mode | Power (W) | Recovery Time (sec) ($T_{Rec}$) | Recovery Power (W) ($P_{Rec}$) |
|---|---|---|---|
| Seek/Read/Write (active) | 2.30 | | |
| Idle (active) | 1.35 | | |
| Idle2 (power-save) | 0.80 | 0.04 | 2.30 |
| Standby (power-save) | 0.26 | 1.37 | 3.00 |

Table 1 also lists the recovery times ($T_{Rec}$) for the two power-save modes. This is the amount of time it takes the disk drive to return from the power-save mode to the active state. The average recovery power ($P_{Rec}$) is also listed. The energy break-even time ($T_{BE}$) can be computed from this information. This is the time the drive needs to remain in the particular power-save mode so that the extra energy consumed during recovery from that mode balances the reduced energy consumption while in that mode. $T_{BE}$ may be estimated, assuming the normal active mode is idle and the recovery time ($T_{Rec}$) is applied only to the power-save mode, as follows:

$$T_{BE} = P_{Rec}(T_{Rec}/P_{Idle}) \quad (1)$$

Table 2 lists the energy break-even times ($T_{BE}$) for the example of Table 1.

TABLE 2

| Energy Break-even Times | |
|---|---|
| Mode | $T_{BE}$ (sec) |
| Idle2 | 0.167 |
| Standby | 3.77 |

In the present invention, the actual user workload is used to determine which power-save mode is the most appropriate and when to enter it. The entry of a power-save mode is thus demand-driven by the user's workload, rather than predetermined by a fixed time selected by the user.

Disk Drive Access Frequency

To optimize energy consumption, it is important to know the types of accesses to the disk drive and how each behaves. For a given power-save mode, an access is defined as an operation that requires a recovery from a power-save mode. For example, if the power-save mode is idle2, where the disk 34 is spinning but the servo control electronics 6 is off and the VCM driver 2 is off, but the buffer 10 containing the disk cache is active, then a disk drive access that requires moving the actuator 31 to read or write data is counted as an access. Cache hits are not accesses for this power-save mode, nor are certain other interface commands, such as status queries from the computer 41, since they do not require reading or writing of data to the disk 34. For simplicity of design, it is not necessary to consider the effect of cache hits when counting accesses. In such a case, any read or write command received over the interface is counted as an access, even if the data resides wholly in the cache. This assumption may reduce the energy savings, but may be cost effective since it reduces complexity in designing the power management technique.

A decision to enter a specific power-save mode, such as standby (spinning down the disk 34), is influenced by the recent access pattern. The access pattern contains information about the software process which is driving it. Access patterns may be characterized in terms of frequencies, i.e., the rate at which disk drive accesses occur, and a distribution of frequencies may be determined from the access history. It is possible to determine when an access frequency being observed does not belong to the distribution of frequencies from the recent access history. This determination is made statistically by estimating the probability that a low access frequency is not part of the recent access pattern, and thus indicates that the access pattern and therefore the associated software process responsible for it has ceased. There are many factors in such a determination. In the present invention, these factors may also be adjusted dynamically based on the performance of the disk drive to provide for adaptive power management.

Also, it is possible to detect periodic accesses from the access frequencies and exit and enter the power-save modes in anticipation of the beginning and end of a periodic access. An example of a periodic access is the timed saving of a word processing document, e.g., where the software user allows the word processing software to automatically write the file to disk every 5 minutes. The ability to exit a power-save mode just prior to the beginning of a periodic access will improve the performance as the user will not see the response latency. The ability to enter a power-save mode immediately after a periodic access ends increases the energy savings since the power-save mode can be entered with a shorter delay.

In the preferred embodiment, disk access patterns are assumed to fall into two categories: uniform access patterns and sporadic access patterns. A uniform access pattern is defined as one for which the set of access frequencies is well defined statistically. For example, the mean and standard deviation of access frequencies may be computed. The access frequencies can be considered well defined if the standard deviation is some fraction of the mean. Otherwise, the access pattern is considered sporadic, i.e., not well defined by a mean and standard deviation. In the uniform case, the access pattern is considered to have ended if the observed access frequency drops below the mean minus some multiple of the standard deviation. This is equivalent to choosing a probability that an observed access frequency belongs in the observed access pattern. It is also possible to use a fraction of the minimum observed access frequency as an estimate of the end of the access pattern. The underlying principle is the use of the recent access frequencies to characterize then determining from this a threshold frequency. It is then assumed to be highly probable that the access pattern has ceased when the access frequency crosses this threshold frequency.

Access Density Measurement

The access frequency is measured by choosing a time window, counting the number of accesses that occur within the window, and converting the member to frequency. A different time window may be chosen for each power-save mode. The number of accesses that occur within a time window is called the access density.

Figure 2:
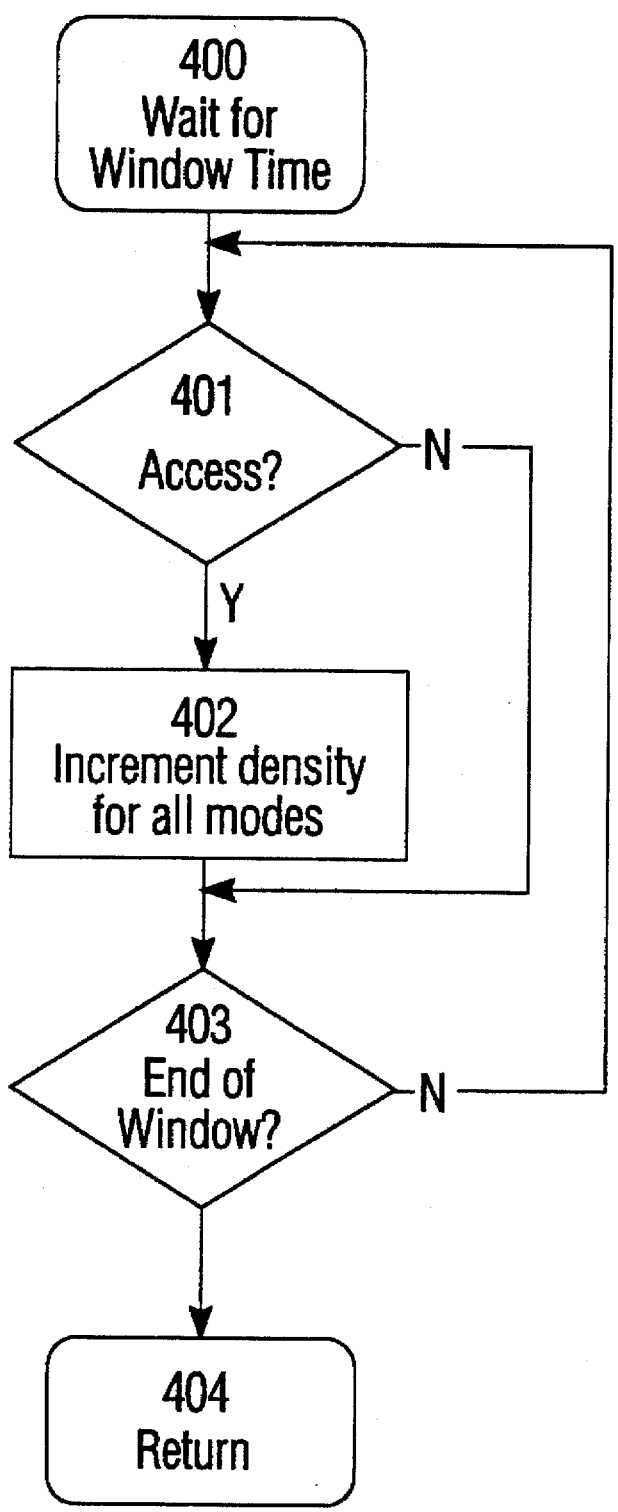
FIG. 2 is a flow chart illustrating the counting of accesses to one or more power-consuming disk drive components within a predetermined time window.

FIG. 2 is a flow chart detailing the measurement of access density. A timer is examined at step 403 to determine if the window time has elapsed. This timer may be in hardware or software. If the window has not ended, then at step 401 the occurrence of an access is checked. If an access has occurred, then the density counter is incremented at step 402. FIG. 2 shows the behavior when all the timing windows are multiples of the shortest window. In such a case, at step 402 the densities for all the power-save modes are incremented. The resetting of the density counters is not shown explicitly, but they are reset after the density value for the current window has been moved to other storage, such as a ring buffer, and prior to accumulating accesses for the next window. For power-save modes with time windows at some multiple of the shortest time window, the density count is reset only at the end of the longer window. FIG. 2 illustrates the behavior for a polling loop design. An equivalent interrupt-based design may be easily derived from FIG. 2.

Figure 3:
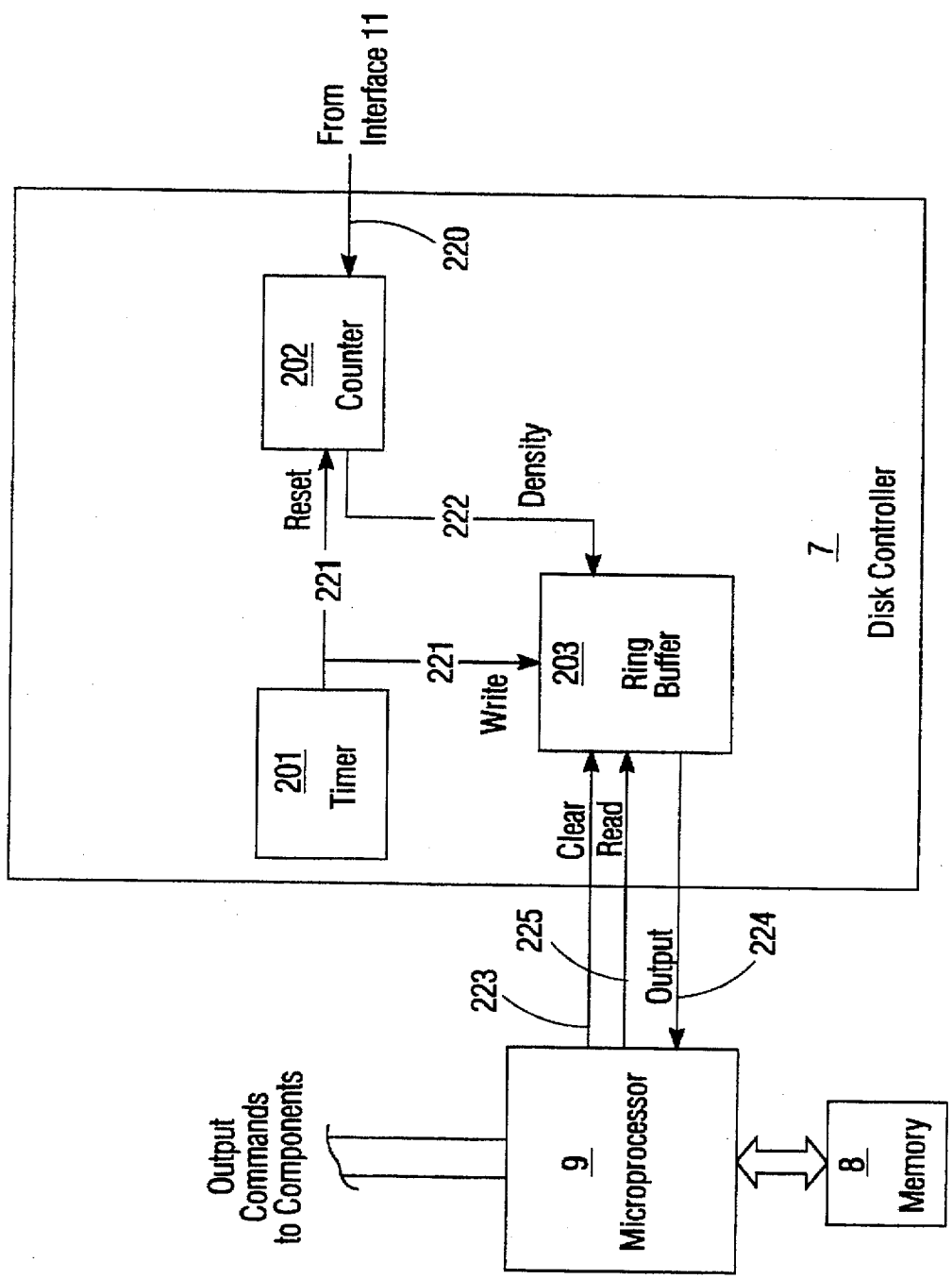
FIG. 3 is a block diagram illustrating a microprocessor coupled to a ring buffer that accumulates access densities.

The process shown in FIG. 2 is part of the function of power module 12 (FIG. 1) and may be implemented in hardware and/or software. FIG. 3 shows a suitable hardware configuration for implementation of the process of FIG. 2. A timer 201, counter 202 and ring buffer 203 are depicted as part of controller 7. The ring buffer 203 is addressable by microprocessor 9. The set of program instructions for performing steps of the process of FIG. 2 (as well as the process of FIGS. 4–6) are stored as microcode in memory 8 which is also addressable by microprocessor 9. An access signal 220 is received by density counter 202 from disk controller 7. For example, signal 220 may be generated by controller 7 in response to a read request across the interface 11 and interface controller 13, or simultaneously when controller 7 transmits a read command to channel 4. An access signal 220 is sent to counter 202 each time there is a disk drive access. Counter 202 counts the accesses 220. Timer 201 operates continuously and outputs signal 221 at the end of each timing window. The density value in the counter is output as signal 222, which is connected to a density storage buffer 203, here shown as a ring buffer. An end-of-window signal 221 from timer 201 causes ring buffer 203 to write the density value 222 to the next memory location and advances the buffer write pointer. Signal 221 then resets counter 202. Density values are read from ring buffer 203 by microprocessor 9. Microprocessor 9 sends clear 223 and read 225 signals to read buffer 203 and receives output signals 224 that represent the density values. The microprocessor 9 uses the density values during execution of the microcode stored in memory 8 to generate commands to the disk drive components to change their power states, i.e., to either enter or exit an appropriate power-save mode.

In general, the time window for a given power-save mode is selected to allow for good response to the range of access frequencies the disk drive will encounter which are appropriate to the mode. Frequencies of interest are those whose periods are close to the power-save mode latencies and energy break-even times. Therefore, a time window close to the energy break-even time will be suitable. The timing window value may be further optimized by testing the behavior of the disk drive, or through simulation. Other factors may be considered in the time window selection, such as performance targets. For the disk drive example of Table 1, good choices for the timing windows are 400 ms for idle2 and 1.6 s for standby.

Conversion of Access Density to Access Frequency

The access density values obtained as described above are the number of accesses occurring in a specified time window. Therefore, the density values may be converted to frequency values by scaling. The dynamic range in frequency may be extended by realizing that a density of 0 is not equivalent to a frequency of 0. When the density is 0, the frequency is computed from the number of consecutive densities of 0. One such conversion equation is:

$$freq = density * scale : density > 0 \qquad (2)$$

$$freq = scale / (number\_zero\_density + 1) : density <= 0 \qquad (3)$$

Number_zero_density is the number of consecutive time windows where the density is 0. Scale is a scaling factor for converting density to frequency. Eqs. 2–3 provide a good approximation of access frequency when the access frequency drops below 1/time_window. For ease of processing, it is natural to use integer frequency units defined by the scale factor. That is, a density of 1 corresponds to a frequency of scale. The scale factor is selected for ease of computation and to provide the desired dynamic range in frequency. Typically, a value of 256 for scale is appropriate for 16-bit processing as it simplifies the scaling when the density is nonzero, thereby reducing the multiplication to a bit-shift operation.

Table 3 below is an example of the density-to-frequency conversion using Eqs. 2–3 and a timing window of 400 ms, e.g., the timing window for the idle2 mode. The top row lists the starting time for each timing window. The second row lists the example access density values for each window. The third row lists the access frequencies derived from the access densities in the second row. For example, 19 accesses have occurred between time 0.4 s and time 0.8 s, which corresponds to a frequency of 4864 with a scale factor of 256. There were no accesses between 1.2 s and 2.0 s, which gives 2 zero-density values. These density values convert to a single frequency value of 256/3=85.

TABLE 3

Example of Density Timing Window's

| Time | ... | 0 | 0.4 | 0.8 | 1.2 | 1.6 | 2.0 | 2.4 | ... |
|---|---|---|---|---|---|---|---|---|---|
| Density | ... | 1 | 19 | 20 | 0 | 0 | 25 | 21 | ... |
| Frequency | ... | 256 | 4864 | 5120 | | 85 | 6400 | 5376 | ... |

It is desirable to minimize the energy management computations to reduce any delays during periods of disk drive accesses. The density approach has the benefit that it requires little computation when accesses of the disk drive are occurring. It may be desirable to skip the density measurement or the density-to-frequency conversion when the disk drive is being accessed heavily. This speeds up the response time, and the access density for such intervals may be set to a fixed value representative of heavy accessing. The access density or frequency values for these intervals may be updated once the disk drive is less busy. For example, a density of 256 may be assigned to the busy intervals which corresponds to a frequency of 65,536 with a scale factor of 256.

The density-to-frequency conversion described above provides estimates of the access frequencies since the exact timing of the accesses is not available from the densities. However, if the window times are chosen accordingly, the estimates will be of sufficient accuracy in the frequency ranges of interest. There are other techniques for measuring or estimating the access frequency which may be applied instead, such as Fourier transform techniques.

Threshold Frequency

Figure 4:
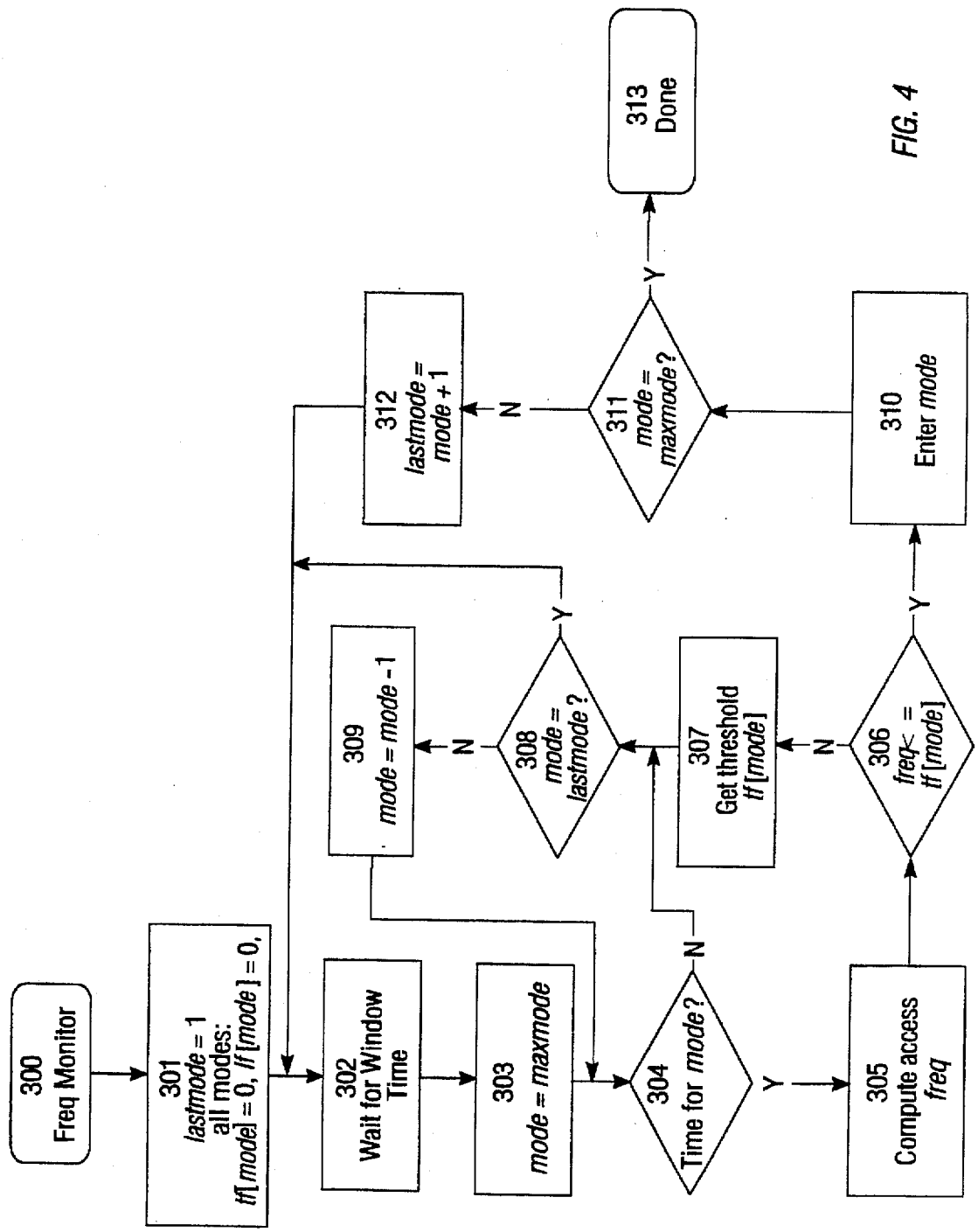
FIG. 4 is a flow chart illustrating the computation of the access frequency and comparison to a threshold frequency for determining when to enter a disk drive power-save mode.

The microprocessor 9 determines that a power-save mode should be entered when the current access frequency drops below a threshold frequency, which is determined from the access history. FIG. 4 is a flow chart detailing the entry of power-save modes. In this flow chart, the various power-save modes are assumed to be numbered from 1 to maxmode, in order of increasing power savings. The term tf [mode] refers to the threshold frequency for the specified power-save mode. The term lf [mode] refers to a low-frequency flag for the specified mode. This flag aids in controlling the computation of threshold frequencies. At step 301, lastmode is set to 1, which implies that all the power-save modes will be examined. For all modes, the threshold frequencies are cleared (tf[mode]=0) and the low-frequency flags are cleared (lf[mode]=0).

Then, at step 302, the process waits until the shortest window time has elapsed, the details of which are shown and described with respect to FIG. 2. Again, in FIG. 4 it is assumed that when more than one window time is used (e.g., each power-save mode has a unique time window) the longer window times are integer multiples of the shortest window time. Once the window time has elapsed and the access density has been measured, step 303 is reached. At step 303, the power-save mode to be tested is set to maxmode, i.e., the mode with the greatest energy saving. At step 304, the process tests to see if the current time is the window time for the mode being tested. If not, step 308 is entered.

At step 308, if the current mode is lastmode, then step 302 is entered and the density is measured for the next time window. At this point, it has been determined that it is not time to examine any active power-save mode. At step 308, if the current mode is not lastmode, step 309 is entered and the next lower mode (mode−1) is selected (in order of decreasing power savings). Step 304 is then entered again. Note that the test of step 304 is always true when lastmode=1, since this is the same condition for exiting step 302. If the test at step 304 is true, then a new density value is available for mode and step 305 is entered. At step 305, the access density measured in step 302 is converted into frequency freq, using the conversion in Eqs. 2–3.

At step 306, the access frequency freq computed in step 305 is compared against the threshold frequency for this mode, tf [mode]. If the access frequency is greater than the threshold frequency, then step 307 is entered. At step 307, the threshold frequency for the current mode, tf [mode], is obtained. The threshold frequency may or may not change, depending on the conditions. (The details of adjusting the threshold frequency will be described with respect to FIG. 5.) Step 308 is then entered and the flow proceeds as described above. At step 306, if the access frequency is less than or equal to the threshold frequency, then step 310 is entered and this power-save mode is entered. This means that microprocessor 9 would then signal the appropriate disk drive components to reduce power. Step 311 breaks the flow by entering step 313 if the current mode is maxmode since there are no further power-save modes available. If there are power-save modes still available for testing, step 312 is entered. At step 312, lastmode is updated to mode+1 to reflect that all the power-save modes less than or equal to the mode entered are no longer under consideration. Step 302 is then entered again.

The testing of power-save modes at step 304 is done in the order of the most energy savings to the least energy savings in order to save the most energy. This results in the disk drive entering the most favorable power-save mode at step 310. It is thus possible for intermediate power-save modes to be skipped. For example, by use of the present invention a disk drive in the idle mode may enter the standby mode without first entering the idle2 mode. If a particular power-save mode other than the maximum mode is entered, then the disk drive will operate in that mode until either it is appropriate to go to a greater mode or until that mode is exited.

Figure 5:
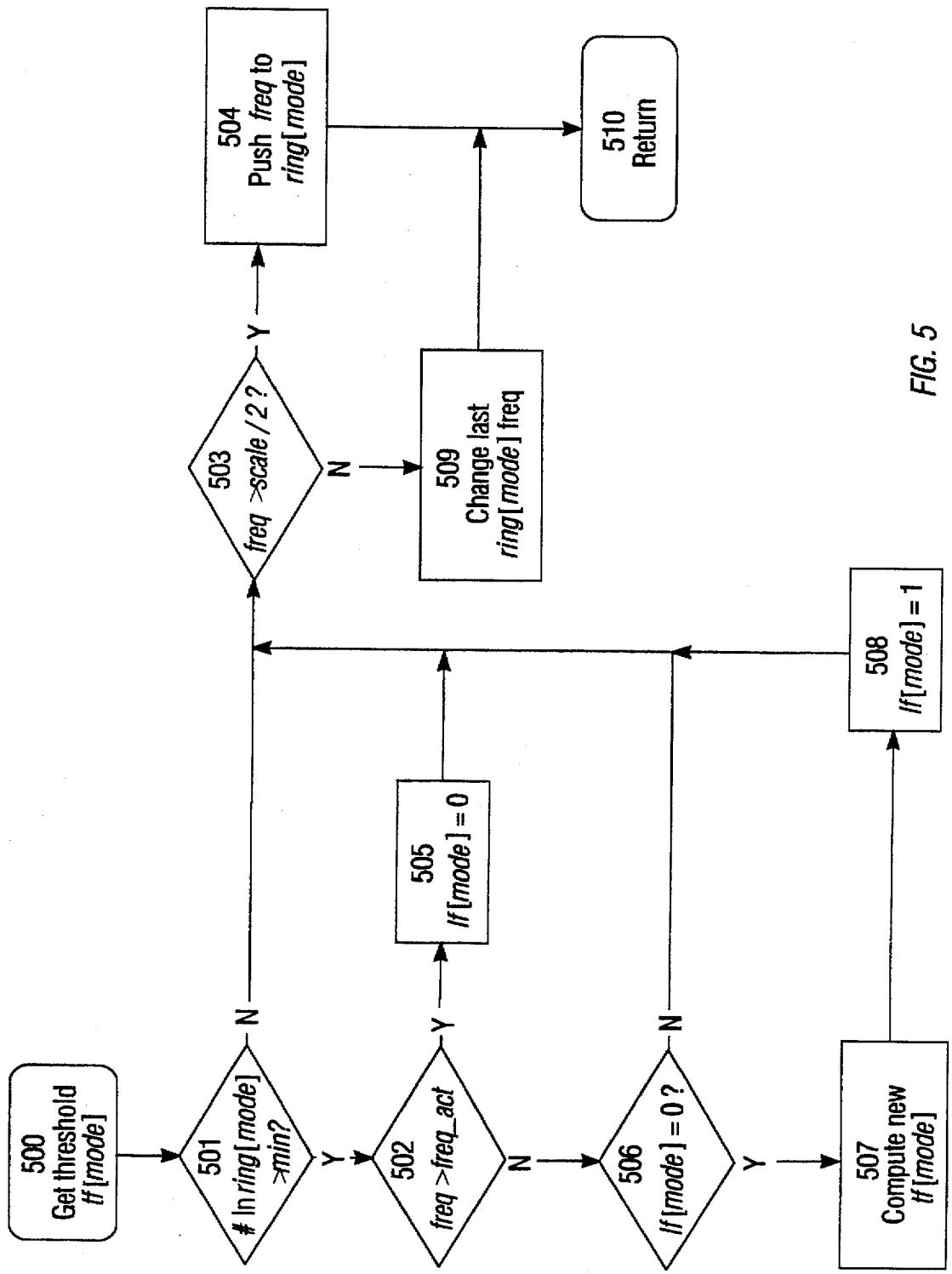
FIG. 5 a flow chart illustrating the computation of the threshold frequency using prior access frequencies stored in a ring buffer.

FIG. 5 is a flow chart showing the details of the preferred embodiment for computing and adjusting the threshold frequency for a power-save mode. The most recent access frequencies are stored in a ring buffer (not shown) addressable by microprocessor 9. This buffer may be different for each power-save mode. The ring buffer is a set of registers (or memory locations) into which each frequency measurement is loaded. The ring buffer can hold a number of frequencies equal to the number of registers (or memory locations) in the set. Once this number of frequencies has been loaded, adding additional frequency values will result in the loss of the oldest value. This has the effect of providing a sliding view of the recent access history.

At step 501, a test is performed to see if there are sufficient values in the ring buffer for this power-save mode to compute the threshold frequency. The minimum number of frequency values is typically 2. Larger numbers ensure greater statistical accuracy, but the values must be collected prior to computing a threshold frequency. If the number of values in the ring buffer is not sufficient, then step 503 is entered. Step 503 tests the current frequency freq to see if it is greater than scale/2, where scale is defined as in Eqs. 2–3. If this test is true, then step 504 is entered and the current frequency value is pushed to the ring buffer. If false, then the last frequency value in the ring buffer must be modified since the number of consecutive time windows with zero density is still increasing. This is performed at step 509. Note that this is not a push operation, thus it does not change the count of values in the ring buffer. Step 510 is entered from both steps 504 and 509 and returns the process to step 501.

At step 501, if the number of values in the ring buffer is sufficient, then step 502 is entered. At step 502, the current access frequency freq is compared against a value freq_act, the active frequency threshold. This value is used to speed up processing and to provide a safety threshold. A value of scale/2 is a typical initial choice for freq_act. If the test at step 502 is true, then the disk drive access frequency is above the active threshold and there is no need for further computations of the frequency threshold. Step 505 is entered and the low-frequency flag lf [mode] is cleared. Step 503 is then entered and flow proceeds as described above.

If the test at step 502 is false, then the access frequency is below the active threshold, so further processing is required. At step 506, the low-frequency flag lf [mode] is tested. If it is set, step 503 is entered again and the current low-frequency threshold value is maintained. The assumption is that once the low-frequency flag is set, the termination of the access pattern is being tested. Therefore, the current frequency is assumed to not be a part of this pattern and should not be used to modify the threshold frequency. However, this frequency is still placed in the ring buffer since the low-frequency flag may be cleared by an increase in the access frequency above the active threshold freq_act. In such a case, the assumption that the access pattern had ceased was incorrect. Therefore, the frequencies occurring during the test are now considered part of the access pattern. If the low-frequency flag is cleared at step 506, then step 507 is entered since a new threshold frequency will be computed. This computation occurs in step 507. At step 508, the low-frequency mode flag is set and step 503 is entered again.

The process shown in FIG. 5 uses a history of the most recent accesses to compute threshold frequencies for each power-save mode. The computation is performed only when the access frequency is below an activity threshold. This has the benefit of only performing the threshold frequency computation when the disk drive is inactive, thereby reducing the impact on performance.

At step 507, the threshold frequency is computed for the power-save mode based on the access history in the associated ring buffer for that mode. The mean and standard deviation can be computed for the values in the ring buffer; however, they involve complex calculations. Instead, for uniform access patterns, the mean frequency meanf may be approximated from the maximum and minimum frequencies in the ring buffer maxf and minf by the following expression:

$$meanf = (maxf + minf)/2 \quad (4)$$

This is a good estimate for a uniform access pattern since the distribution is assumed to be well characterized. The standard deviation sdevf can be estimated from the range of frequencies as $$sdevf = (maxf - minf)/4 \quad (5)$$

Thus, there is no need to actually compute the mean and standard deviation, and it is desirable to replace them with the simpler Eqs. 4 and 5. For sporadic access patterns, some fraction of the minimum frequency is sufficient. Eqs. 6–8 below show the computation used in step 507.

$$t1[mode] = (maxf + minf)/2 - g1[mode]*(maxf - minf) \quad (6)$$

$$t2[mode] = minf/g2[mode] \quad (7)$$

$$tf[mode] = max(t1, t2) \quad (8)$$

The value t1[mode] corresponds to uniform access patterns, while the value t2[mode] corresponds to sporadic access patterns. The larger of these two values is used for the threshold frequency for the given mode.

There are two gain factors: g1[mode] and g2[mode]. For uniform and sporadic access patterns, respectively. The gain factors may be different for each mode. For the disk drive of Table 1, values of g1=1 and g2=4 are suitable for both the idle2 and standby modes. As can be observed from Eqs. 6–7, increasing the value of the gain factors has the effect of decreasing the threshold frequency and decreasing the value of the gain factors has the effect of increasing the threshold frequency. Therefore, the power-save mode entry behavior may be tuned through choice and adjustment of these gain factors. The gain factors can be selected and adjusted by the user through suitable system or application software.

Separate ring buffers may be used for each power-save mode, and the sizes of the buffers may be selected independently. Increasing the size of a buffer will increase the time over which the access history is collected, while decreasing the size will decrease the time. The selection of a buffer size is also influenced by the desire to limit the history length, which improves responsiveness to the more recent events, and to limit the amount of memory required. For the disk drive of Table 1, a size of 16 is suitable for the buffers for the two modes. More elaborate methods for maintaining the access history are possible. For example, the frequencies in the ring buffer can have weighting factors associated with the length of time in the buffer. An access frequency histogram can be used in place of the ring buffer with a mechanism for removing old data, such as renormalizing. However, the ring buffer has the advantage of simplicity of design.

Figure 6:
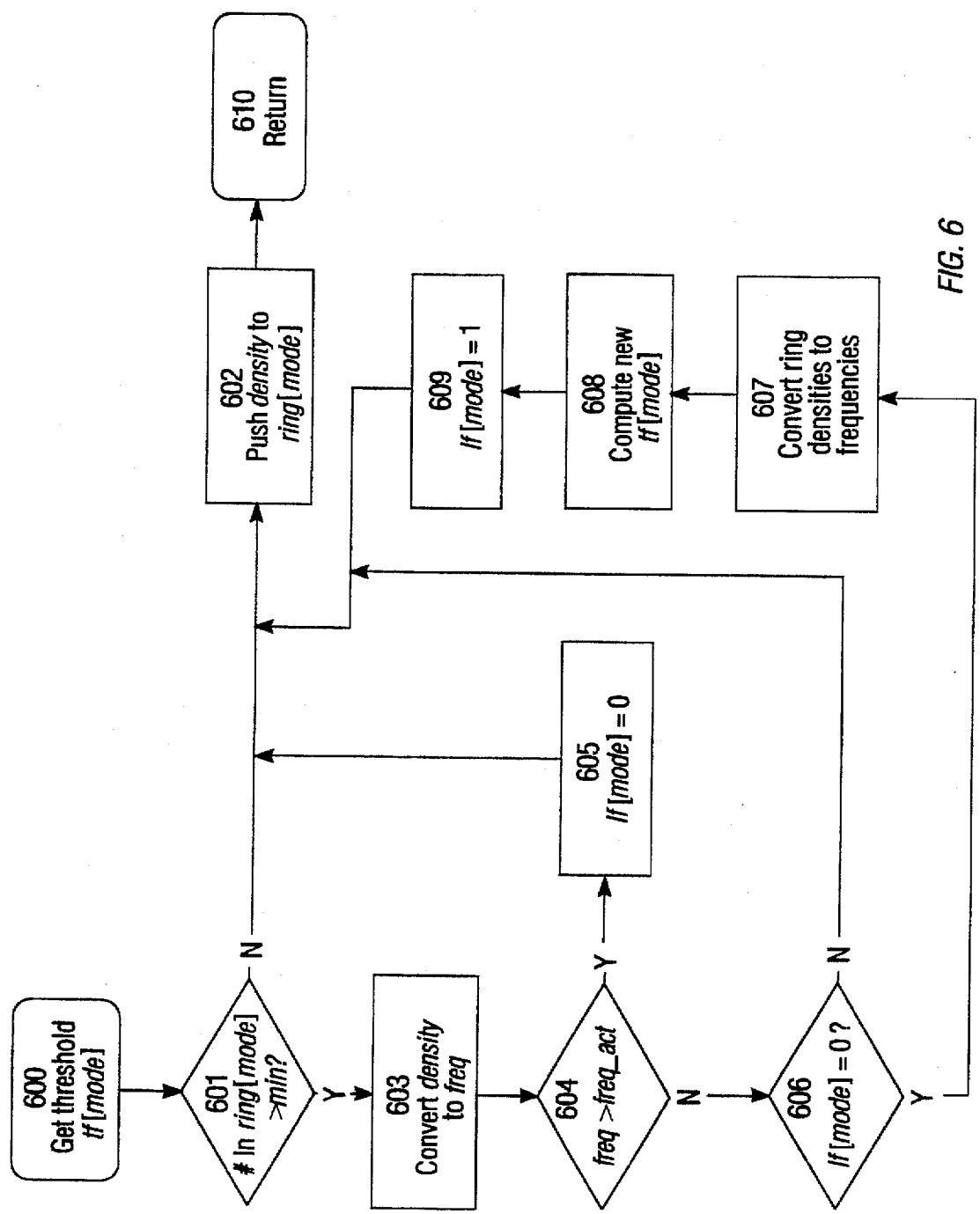
FIG. 6 a flow chart illustrating the computation of the threshold frequency using prior access densities stored in a ring buffer.

The ring buffers may also be configured to hold densities instead of frequencies, as shown in FIG. 3. In this case, the densities are converted to frequencies during the threshold frequency computation. The process of computing the threshold frequency using a density buffer is shown in FIG. 6. The flow corresponds closely with that in FIG. 5, with a few exceptions. Step 601 corresponds to step 501. There is an additional step 603, where density is converted to freq using Eqs. 2–3. Steps 604, 605, and 606 correspond to steps 502, 505, and 506, respectively. There is an additional step 607 wherein each density value in the ring buffer is converted to a frequency value using Eqs. 2–3. Note that this can result in fewer frequency values than the number of density values in the ring buffer since consecutive 0 densities are converted to single frequency values. Steps 608 and 609 correspond to steps 507 and 508, respectively. Finally, step 602 pushes the current density value to the ring buffer for the selected power-save mode.

Both of these ring buffer configurations are suitable for computing the threshold frequency. The frequency buffer has the advantage of having a history length that increases in time when there are low frequencies present. The density buffer has the advantage of having a fixed history length, and has reduced computational overhead during intervals with disk access activity since it delays the conversion of density to frequency until the active frequency threshold is crossed.

As described above, once a power-save mode has been entered, it may be exited either by entering another power-save mode or by returning the drive to the active state. The former occurs when the estimated access frequency continues to drop, crossing the threshold frequencies of other modes. The latter occurs when either a disk drive access occurs or when a periodic access pattern has been detected that results in a drive-initiated entering of the active state. When the disk drive returns to the active state, it may be desirable to clear the ring buffers since it is assumed that a new access pattern is being measured. This adds a further limit to the influence of old patterns on the ring buffers. In some configurations, it may be desirable to retain the ring buffer data, perhaps altering the weighting factor for the data from the prior pattern.

Other factors may be used to adjust the gain factors to thereby influence the determination of the threshold frequency. For example, the desirability of entering a power-save mode where the head is unable to immediately read or write data (such as standby, where the disk is spun down) can be weighted by the current cache hit ratio. A high cache hit ratio may be used to adjust the threshold frequency upward, for example, by decreasing the gain factors. Even if an access occurs shortly after the threshold frequency is crossed, it is likely to hit the cache. Therefore, the probability of using extra energy is still reduced. Similarly, a low cache hit ratio would result in a lower threshold frequency being desirable since probability of a subsequent access requiring reading or writing from the disk would be high. In such cases, an additional power-save mode for controlling the power to the cache (buffer 10 in FIG. 1) may be desirable. This allows the cache buffer to remain active even in standby mode. The gain factors for this mode are influenced by the cache hit ratio as well. For high hit ratios, it may be desirable to decrease the threshold frequency for performance, allowing more cache hits to be captured. It is also possible to look at specifics of the cache accesses, such as treating reads and writes separately, or using the locality of accesses. All of these may be used to adjust the gain factors and thereby the threshold frequency.

Adjustability of Power-Save Mode Entry Behavior

There are a number of adjustable parameters in the above-described design. These include the gain factors g1 and g2, the timing window size, the ring buffer size, the density-to-frequency scale factor scale, and the active threshold frequency. However, in the preferred embodiment the most appropriate parameters for adjusting the behavior of the power-save mode entry behavior are the gain factors in Eqs. 6 and 7. The adjustable parameters may be fixed at the time of disk drive manufacture, or they may be adjustable, either by the user to suit a specific application, or dynamically based on power management past performance penalties.

User-Adjustability

As mentioned above, it is possible to use a command from computer 41 through interface controller 13 (FIG. 1) to set the gain factors directly. However, it is more advantageous to hide the internal details of the energy management from computer 41. Therefore, a separate parameter, called a performance factor, pf, is used. It is adjusted by a command from computer 41 and is independent of the specific energy management design implemented in the disk drive.

Energy management with power saving modes in a disk drive typically involves a tradeoff between access performance and energy savings. This is a direct result of the recovery latencies of the power-save modes discussed above. A single weighting performance factor that describes the importance of the energy vs. performance tradeoff is highly desirable. At one extreme, the factor would favor maximizing the energy savings without regard to performance. At the other extreme, the factor would favor performance without regard to energy savings. This is quite different from conventional disk drive power management techniques, where the energy management commands adjust the fixed times to enter the power-save modes. These commands do not relate directly to performance or energy savings. Further, different drives will produce different energy savings and performance impacts, even with the same fixed time settings. However, the scale of the energy vs. performance factor can be fixed, allowing all drives to behave similarly. In the preferred embodiment, the performance factor interface command is as defined as in Table 4 below.

TABLE 4

Performance Factor Command

| Performance factor pf value | Result |
| --- | --- |
| 0 ... 254 | Linear scale between maximum energy savings and maximum performance |
| 255 | Energy management off |

A value of 0 corresponds to maximum energy savings and a value of 255 to maximum performance (no energy management). This user-selected performance factor command can also be emulated using the standard fixed time commands available on the common disk drive interfaces, such as SCSI or IDE. In the case of IDE, the standby mode time values range from 0 (no power-save mode) to 255, where the actual time=5s*value for most values, giving a time range from 5 seconds to about 20 minutes. In translating this command into a performance factor, 0 would be maximum performance, and the linear scale from Table 4 would range from values of 1 to 255 instead of 0 to 254.

In the preferred embodiment, the input from the performance factor command is translated to the behavior of the energy management system by adjusting the gain factors, g1 and g2. This will result in the gain factors varying between two limits which represent the energy and performance extremes. For example, for the uniform access category of Eq. 6, g1 corresponds to a multiplier on an estimate of the standard deviation, sdev. This suggests some practical limits on g1: $0.5 < g1 < 5$. Similarly, since g2 is a fraction of the minimum frequency, minf, there are practical limits on it as well: $1 < g2 < 10$. Statistically, the lower limit on g1 corresponds to about a 20% probability for normally distributed data that the threshold frequency is actually part of the distribution. Too small a lower limit will result in a high probability of entering a power-save mode inappropriately, and can actually increase energy usage. The upper limit on g1 corresponds to about $10^{-6}$ probability, which is likely more than sufficient. The behavior of the limits is similar for g2, although they are not as well defined statistically. To improve the selection of the limits, it may be desirable to consider empirical data on performance and energy behavior. Further, there may not be a need to achieve the fine resolution of Table 4, as many settings my be only marginally distinguishable in practice. Eqs. 9 and 10 below show the performance factor pf conversion for the command of Table 4 for the disk drive with the power values of Table 1.

$$g1 = (12 + pf/4)/16 \qquad (9)$$

$$g2 = (24 + pf/2)/16 \qquad (10)$$

The limits here are roughly $0.75 < g1 < 4.75$ and $1.5 < g2 < 9.5$. Eqs. 9 and 10 are designed for ease of implementation with integer arithmetic, since the divisions may be replaced by shift operations. It is desirable to perform the scaling by the factor of 16 as the last step of evaluating Eqs. 6 and 7.

Other parameters, such as the timing window size, may also be adjusted using the performance factor. In general, larger values result in improved performance at the expense of power consumption. Further, a subset of the available power-save modes may be chosen. For example, there may be some power-save modes that affect performance more than others, and it may be desirable to not use them when performance is important. The advantage of the performance factor pf described above is that it allows the disk drive designer to determine which parameters to adjust to meet the performance goal, without the end user or systems integrator knowing the details of the specific implementation.

Dynamic Adjustability Based on Performance Penalties

The power-save modes are entered based on the frequency of disk drive accesses. Satisfactory power management behavior is obtained using Eqs. 6 and 7, where the parameters are fixed until new values are selected. The suitability of a set of selected parameters, e.g. gain factors, may depend on the actual access pattern. New parameters must be selected if changes in the access pattern affect the power-save mode entry behavior. However, the parameters may be dynamically adjusted to follow changes in the access pattern. This is done using an adaptive system, which measures how the performance goal is being met, and dynamically adjusts the gain factors accordingly.

Achieving dynamic adaptability requires the ability to measure the actual behavior, for comparison with the desired behavior. The best performance will be obtained when both the magnitude and direction of the deviation from the performance target are measured. These measurements may be treated as penalties, which are then used to adjust the gain factors. For power management, it is convenient to define two classes of penalties: energy/response penalties (erp) and missed opportunity penalties (mop). The former occur when the disk drive is either using excess energy or impacting performance. This implies that the threshold frequency tf was set too high. The latter occur when the disk drive has not entered power-save modes when it would have been appropriate. This implies that the threshold frequency was set too low. Since the two types of penalties have opposite effects on the threshold frequency determination, they can be used to balance the behavior of the system.

Since the penalties are used to adjust parameters in the threshold frequency equations, they may be computed in any convenient units. Computing the penalties in time units has the advantage of simple computations. Computing the penalties in frequency units has the advantage of having some input values available from the demand driven computations.

Figure 7:
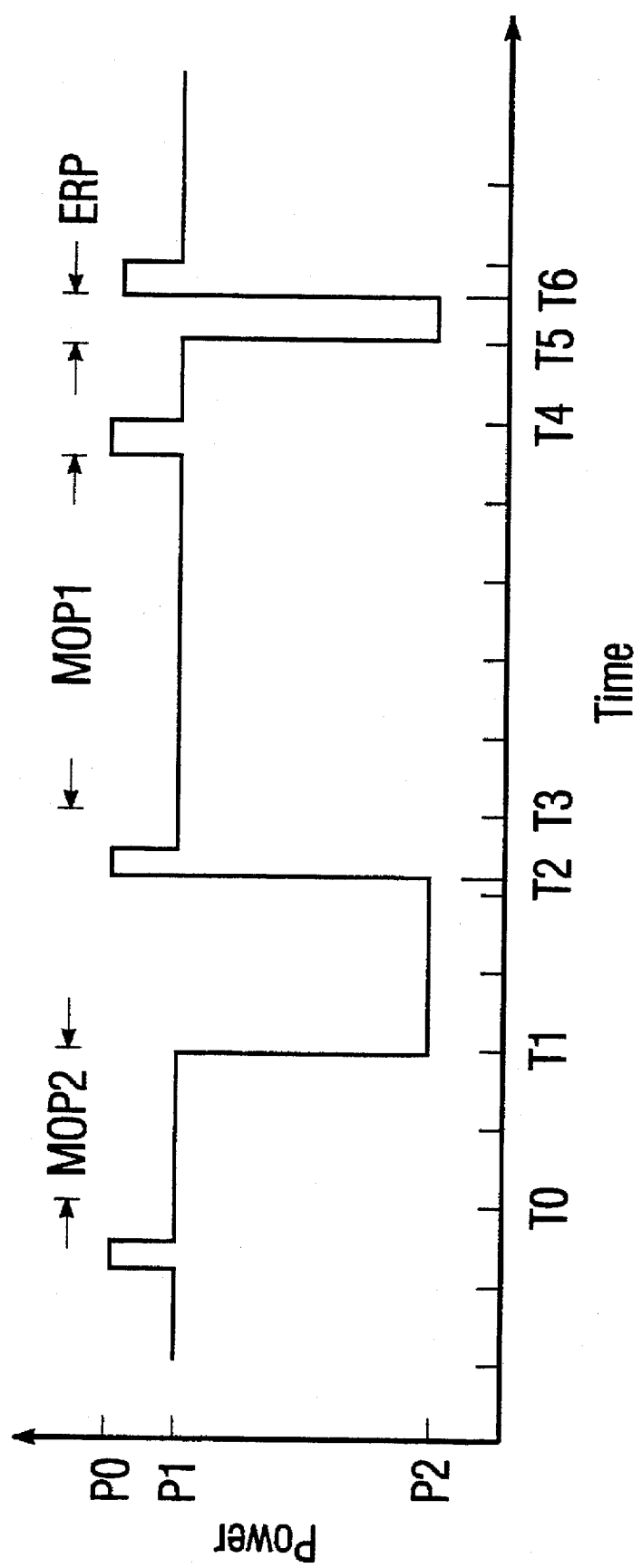
FIG. 7 is a plot illustrating a time sequence for the entry and exit of a power-save mode.

FIG. 7 is a plot illustrating a time sequence for the entry and exit of a power-save mode. Time is plotted on the horizontal axis, and power on the vertical axis (in arbitrary units). Each short tick mark on the horizontal axis represents a timing window for the power-save mode. Three power levels are indicated: the seek/read/write power P0, the idle power P1, and the mode power P2. For clarity, disk drive accesses are all shown as a brief interval at power level P0. The disk drive starts in the idle state, at power level P1. Time T0 is the beginning of a timing window where an access occurs. The power-save mode is entered at a later time T1, and lasts until time T2, when the next disk access occurs, and the drive returns to the active state. A further disk access occurs in the timing window beginning at T4. The power-save mode is entered again at T5, and is exited at T6, when another disk access occurs.

Figure 8:
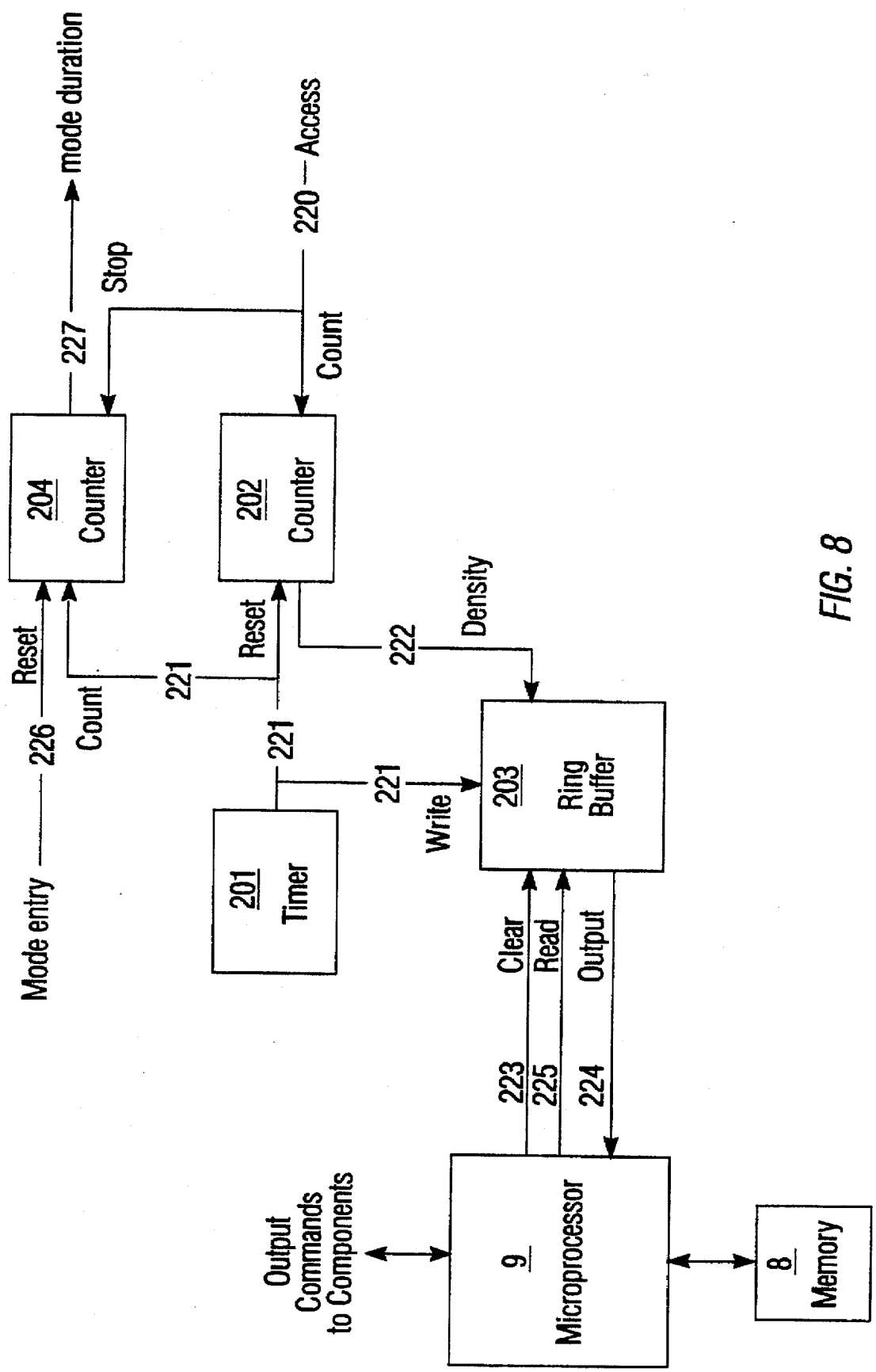
FIG. 8 is a block diagram like that of FIG. 3 but with the addition of a counter for counting time windows between the entry and exit of a power-save mode.

For performance penalties, the durations of the power-save modes are important. FIG. 8 shows the addition of a counter 204 to the hardware configuration previously described and illustrated in FIG. 3. Counter 204 counts the number of time windows 221 between the mode entry 226 and the mode exit, shown as access 220. Output 227 is the duration of the mode, in time window units. This output is available after the mode is exited. This value may be used directly for time traits, or converted to frequency units via Eqs. 2 and 3.

Energy/Response Penalties

For the energy/response penalty erp, both the energy impact and the response time impact are measured. Energy penalties ep are a measure of how much extra energy is used when a power-save mode is entered inappropriately. Response time penalties rp are a measure of how much impact there is on the actual data throughput when a power-save mode is entered inappropriately. In the example FIG. 7, two example mode entries are shown, one at times T1 to T2 and one at times T5 to T6. An energy/response penalty might occur for the mode entered at T5, but not for the mode entered at T1. This is indicated by the ERP label in FIG. 7. For energy penalties, there is a time to energy break-even, $T_{BE}$, for the power-save mode, where the energy saved during the duration of the mode is balanced by the recovery energy. Considering the first mode entry of FIG. 7 as a reference, T0 refers to the last timing window with an access density >0, T1 refers to the time at which the mode is entered, and T2 the time at which the mode is exited. The value T2–T1 is the mode duration from counter 204 in the hardware implementation. An energy penalty ep occurs if T2–T1<$T_{BE}$. The energy penalty ep is computed as a function of T2–T1 and $T_{BE}$. In the preferred embodiment, $$if(T2-T1<T_{BE})ep=16-16*(T2-T1)/T_{BE};$$

$$\text{else } ep=0; \tag{11}$$

In Eq. 11, the energy penalty ep is computed to range linearly from a value of 16 when the duration of the power-save mode is essentially zero (an access occurred immediately following entry of the mode) to a value of 0 when the energy break-even time is exceeded. Other energy penalty equations are possible, which provide different weightings of the penalties. However, Eq. 11 is fairly simple, and provides a good estimate of the energy impact. In practice, the values of the parameters in Eq. 11 need not be precise, and the computation may be performed in integer arithmetic. In integer arithmetic, there will be 16 penalty levels, which provides sufficient resolution.

The response time impact of a power-save mode can be computed based on the additional latency incurred due to recovery, rl. This is an estimate of the impact on the throughput (a measure of the disk drive performance). Therefore, an upper bound on the throughput impact tub can be derived from the performance factor. The throughput impact from a power-save mode is measured as rl (T2–T0). Therefore, there is a response limit time trl, which depends on the throughput upper bound tub:trl=rl/tub. A response penalty occurs whenever T2–T0<trl. The value T2–T0 may be computed from the threshold frequency and the mode duration T2–T1, since $$tf=scale/(T1-T0+1), \tag{12}$$

therefore $$T2-T0=T2-T1-1+scale/tf \tag{13}$$

The response penalty rp is computed as a function of T2–T0 and trl. In the preferred embodiment, $$if(T2-T0<trl)rp=16-16*(T2-T0)/trl;$$

$$\text{else } rp=0; \tag{14}$$

In Eq. 14, the response penalty rp is computed to range linearly from a value of 16 when the duration of the power-save mode is essentially zero to a value of 0 when the response limit time is exceeded. Other response penalty equations are possible, which provide different weightings of the penalties. However, Eq. 14 is fairly simple, and provides a good estimate of the throughput impact. In practice, the values of the parameters in Eq. 14 may be performed in integer arithmetic. In integer arithmetic, there will be 16 penalty levels, which provides sufficient resolution.

The energy penalty ep and the response penalty rp are combined to produce the energy/response penalty erp. In the preferred embodiment, only the larger of the two penalties is used as the energy/response penalty. This simplifies the computation, since only the penalty with the larger time limit $$mtl = \max(T_{BE}, trl) \tag{15}$$

needs to be computed. However, it may be desirable to compute the energy/response penalty using both the energy and response penalties, for example, by using a weighted average.

The energy and response penalties can also be computed in frequency units. In this case, the time values $T_{BE}$ and trl are computed as the corresponding frequencies according to Eqs. 2 and 3. There will be an energy break-even frequency fbe, and a response limit frequency frl. The mode duration is converted to frequency value fmd using Eqs. 2 and 3. The penalty equations are if$(fmd > feb)ep = 16 - 16 * feb/fmd$;

else $ep = 0$; \hfill (16)

and if$(1/fmd - 1/tf > 1/frl)rp = 16 - 16 * frl * tf * fmd/(tf - fmd)$;

else $rp = 0$; \hfill (17)

Again, in the preferred embodiment only the larger of these two penalties is used, therefore only the penalty with the lower frequency limit needs to be computed $$mfl = \min(fbe, frl) \tag{18}$$

The energy and response penalties are computed when the mode is exited to return to the active state. No penalty occurs if a deeper mode is entered, since the recovery penalties will be associated with that mode.

Missed Opportunity Penalties

For missed opportunity penalties mop, the usage of the power-save modes is compared against ideal behavior, where no energy or response penalties occur. A missed opportunity occurs either when a power-save mode was not used (type 1), or when the threshold frequency for entering a mode was too low (type 2). Both types of opportunities are considered only if it is possible to use the intervals without incurring energy or response penalties. In FIG. 7, the interval T3 to T4 is an example of a type 1 opportunity (labeled MOP1), while the intervals T0 to T1 and T4 to T5 are examples of type 2 opportunities. The interval T0 to T1 might result in a type 2 penalty (labeled MOP2), while the interval T4 to T5 might not. Like the energy/response penalty, the missed opportunity penalty may be computed in any convenient units, with frequency and time being the most convenient.

The missed opportunity penalty may be computed in time units. For a power-save mode, a missed opportunity occurs when an interval is missed. Considering FIG. 7 as a reference, the values T0, T1 and T2 are defined as in the prior section. For type 1 opportunities, the relevant times are T3, the last timing window with an access density greater than zero, and T4, the time of the next disk access when no power-save mode was entered in the interval. The value T4–T3 represents the length of the interval, and may be computed from the access frequency using the following equation:

$$T4 - T3 = scale/freq - 1 \tag{19}$$

where freq is the measured access frequency. Of course, only intervals larger than the energy break-even time and the response limit need be considered. The type 1 missed opportunity penalty equation is $$mop1 = (T4 - T3)/mtl \tag{20}$$

Eq. 20 results in a penalty of 0 if the opportunity (T4–T3) would result in a penalty when implemented in integer arithmetic. The magnitude of the penalty is dependent on how much larger the opportunity is than the larger of the energy break-even time or the response limit. Thus larger penalties are incurred for larger opportunities, and smaller penalties for smaller opportunities.

For type 2 opportunities, where a power-save is entered, the value T1–T0 may be computed from the threshold frequency using the following equation:

$$T1 - T0 = scale/tf - 1 \tag{21}$$

The type 2 penalty is used only when it is possible to have a power-save mode with no energy or response penalties, and when the threshold frequency allowed an undesirable amount of energy to be expended prior to entering the mode. This is accomplished by Eq. 22:

$$mop2 = (T1 - T0)/mtl \tag{22}$$

As is the case with type 1, no penalty occurs if the opportunity would incur an energy or response penalty. In the case of type 1, this is an absolute limit. In the case of type 2, it is an approximation, since incurring an energy penalty or response penalty depends on both the type 2 opportunity and the mode duration. However, Eq. 22 has the advantage of being very simple to implement.

The missed opportunity penalty may also be computed in frequency units. For type 1 opportunities, the penalty occurs when the measured frequency freq drops below the low frequency penalty limit mfl. In this case, $$mop1 = mfl/freq \tag{23}$$

is a good penalty equation. For type 2 opportunities, the equation is $$mop2 = mfl/tf \tag{24}$$

The advantage to computing the penalties using frequency units is the ready availability of the current frequency freq and the threshold frequency tf. However, time units may be preferred for ease of implementing in hardware with counters, or when time units are used for the energy and response penalties (for consistency).

Clearly, other penalty equations are possible. The above description assumes that missed opportunity penalties would not be taken if energy or response penalties would result. In some cases, it may be desirable to have missed opportunity penalties occur in these instances. The penalty might then have an additional weighting factor depending on the magnitude of the energy or response penalty.

When there are multiple power-save modes, the penalty values are preferably determined for each mode. This is highly desirable when the modes have different timing windows, since they would be responding to different portions of the access frequency spectrum. For a given mode, the entries of other modes may be used in the penalty determinations, but this is not necessary. For example, penalties may be examined for all modes in all intervals, or only for the most optimum modes. Further, it is advantageous to keep multiple penalties for each power-save mode. For example, Eqs. 6–8 represent the cases of uniform and sporadic access patterns. A set of penalties is kept for both of these categories, allowing the independent dynamic adaptability for these two cases. This is accomplished by noting which category is active during a given interval, and computing the penalties for that particular category.

Penalty History

Figure 9:
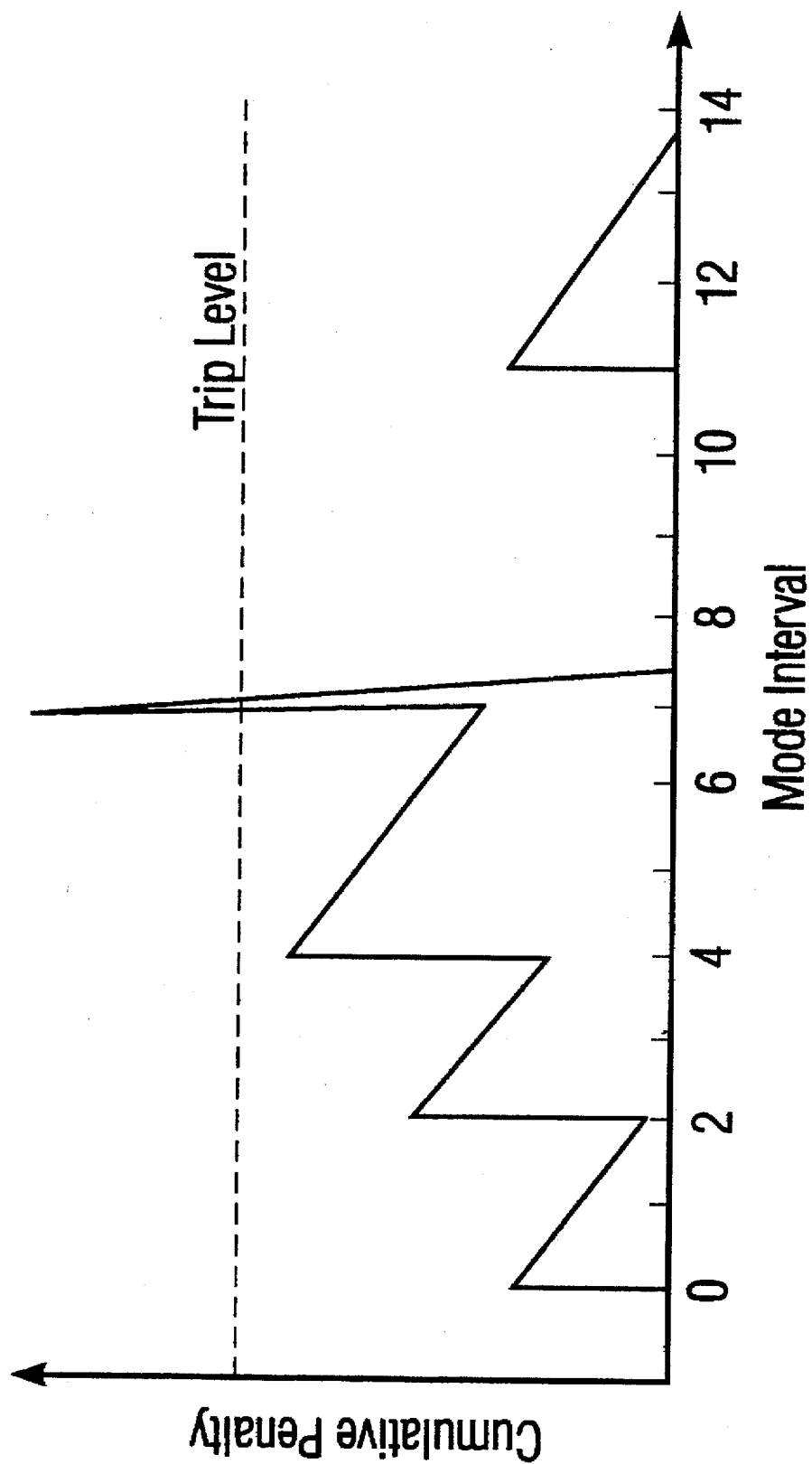
FIG. 9 is a plot of cumulative energy/response penalty as a function of time for illustrating adjustment of the gain factors when the trip level is crossed.

The time histories of the penalties are used to adjust the parameters, preferably the gain factors g1 and g2, in the threshold frequency computations of Eqs. 6 and 7. In the preferred embodiment, as individual penalties occur, they are added to a corresponding cumulative penalty value: cerp for cumulative energy/response penalties and cmop for cumulative missed opportunity penalties. When one of these values crosses a predetermined trip level, then the selected parameters of the threshold frequency calculation are changed accordingly, and the cumulative value reduced. When the power-save mode is entered without incurring a penalty, then the corresponding cumulative penalty value is decreased by some amount. This has the effect of decaying the penalty over time, such that older penalties have less influence than newer penalties. This process is illustrated in FIG. 9. The horizontal axis is labeled mode interval, where each tick corresponds to a mode entry (or an opportunity). The vertical axis is the cumulative penalty magnitude, cerp. At interval 0, a penalty occurs and the cumulative penalty value is increased. No penalty occurs at interval 1, so the cumulative penalty value decreases. This behavior continues, with the cumulative penalty increasing with each new penalty, and decreasing at a fixed rate when no penalty occurs. At interval 7, the magnitude of the new penalty combined with the cumulative penalty is sufficient to cross the penalty trip level shown. At this point, the gain factors in Eqs. 6 and 7 are modified, and the cumulative penalty value reduced to zero. The cumulative penalty is cleared on the assumption that the parameter adjustment has changed the behavior, so a new measurement is required. This effect is shown in the time intervals after interval 8, where there are fewer penalties, and the penalties are smiler than in the earlier time intervals.

In the preferred embodiment, the energy/response penalty (the larger of ep and rp) is added to the cumulative penalty cerp when such a penalty occurs.

$$cerp=cerp+\max(ep,rp) \qquad (25)$$

The cumulative penalty is then compared against a predetermined trip level erpt, and the gain factors g1 and g2 in the threshold frequency computation changed. In the preferred embodiment, the penalties are tracked separately for uniform and sporadic accesses, and the appropriate gain factor, g1 or g2, is incremented. A good value for erpt is 16. As described above, there are practical limits on the gain factors, and these may be used to restrict the upper bounds on the gains.

If there is no penalty, then the cumulative penalty cerp is decreased by a predetermined amount (cerd) at each mode exit, to a lower limit of zero.

$$cerp=cerp-cerd \qquad (26)$$

cerd acts as the decay rate for the cumulative penalty. Typically, a value of 2 is suitable for cerd. A larger value will decrease the effect of penalties at a faster rate, and a smaller value will do so at a slower rate.

The missed opportunity cumulative penalty cmop is computed similarly to the energy/response cumulative penalty. It is possible to treat the type 1 and type 2 penalties distinctly (separate cumulative penalties), or to apply them to the same cumulative penalty, which is simpler. When a missed opportunity penalty occurs, the appropriate value (mop1 or mop2) is added to the cumulative penalty cmop. In the preferred embodiment, the appropriate gain factor g1 or g2 is decremented when the cumulative penalty exceeds a trip level mopt. A good value for mopt is 16. As described above, there are practical limits on the gain factors, and these may be used to restrict the lower bounds on the gains. If there is no penalty, then cmop is decreased by a predetermined amount cmod, to a lower limit of zero. Again, a value of 2 is suitable for cmod.

Figure 10:
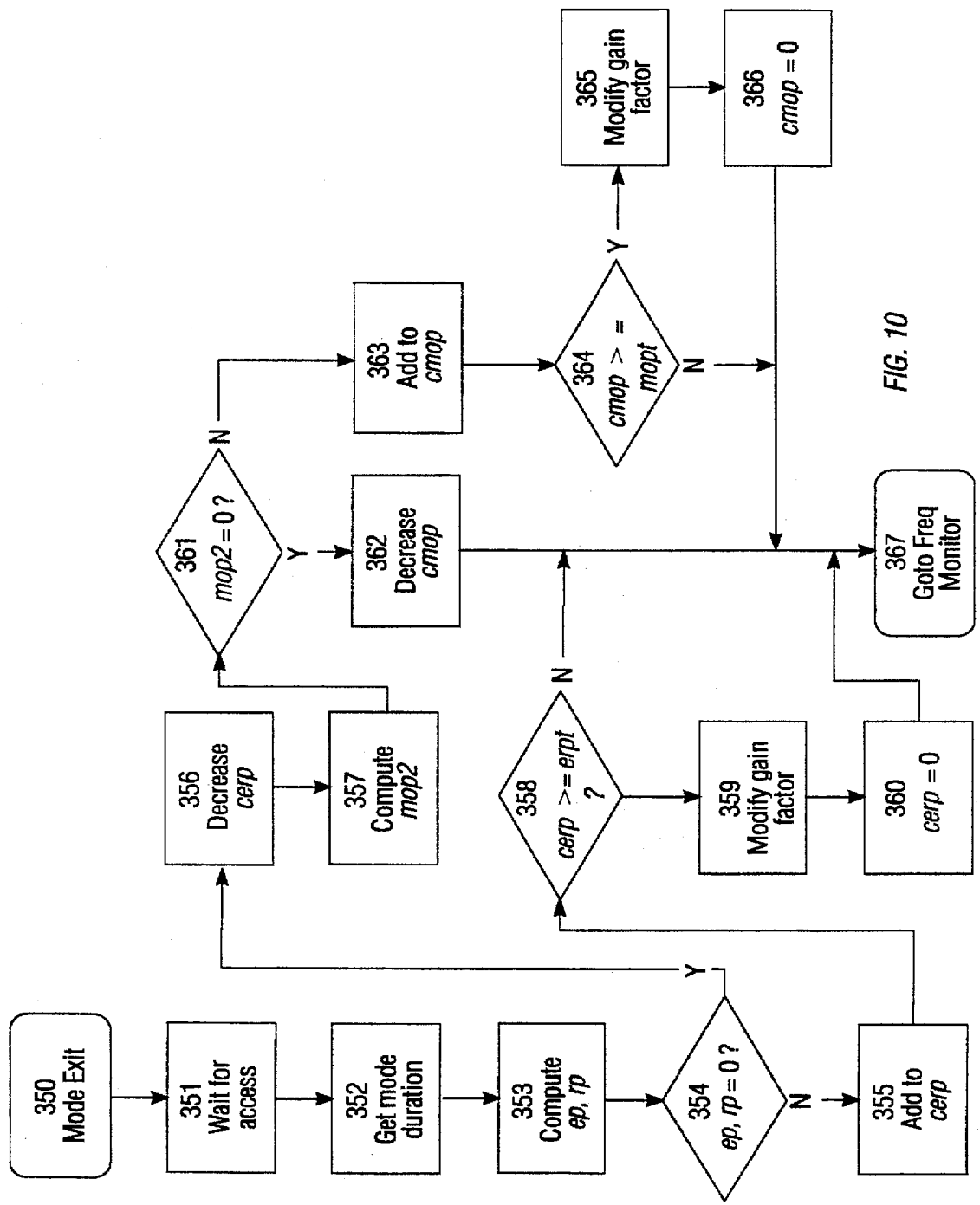
FIG. 10 is a flow chart illustrating the computation of the energy/response and missed opportunity penalties when a power-save mode is exited.

The energy/response penalty erp and type 2 missed opportunity penalty mop2 are computed when a mode is exited. The details of this process are shown in FIG. 10. Step 350 is entered either from step 313 of FIG. 4, when the deepest mode has been entered. Step 352 is entered from step 401 of FIG. 2, when an access occurs and the drive is currently in a power-save mode. Step 351 waits for an access when entered from step 350. At step 352, the mode duration is obtained as described above. At step 353, the energy penalty ep and response penalty rp are computed as described above. Step 354 tests to see if either is a penalty. If there is no penalty, step 356 is entered. If there is a penalty, step 355 is entered. At step 355, the penalty is added to the cumulative penalty, cerp. At step 358, the cumulative penalty is tested against the penalty trip level, erpt. If the trip level is not exceeded, step 367 is entered, which returns control to step 300 of FIG. 4. If the trip level is exceeded, then at step 359 the appropriate gain factor is modified. At step 360 the cumulative penalty is set to 0, and step 367 is entered. At step 356, there was no penalty, therefore the cumulative penalty value is decreased. At step 357, the type 2 missed opportunity penalty is computed, using Eq. 24. Step 361 tests to see whether a penalty occurred. If there was no penalty, at step 362 the cumulative penalty is decreased, and step 367 is entered. If there was a penalty, then step 363 adds the penalty to the cumulative penalty. Step 364 tests whether the cumulative penalty exceeds the trip level. If not, then step 367 is entered. If exceeded, then at step 365 the appropriate gain is modified, and at step 366 the cumulative penalty is set to 0, and step 367 is entered.

Figure 11:
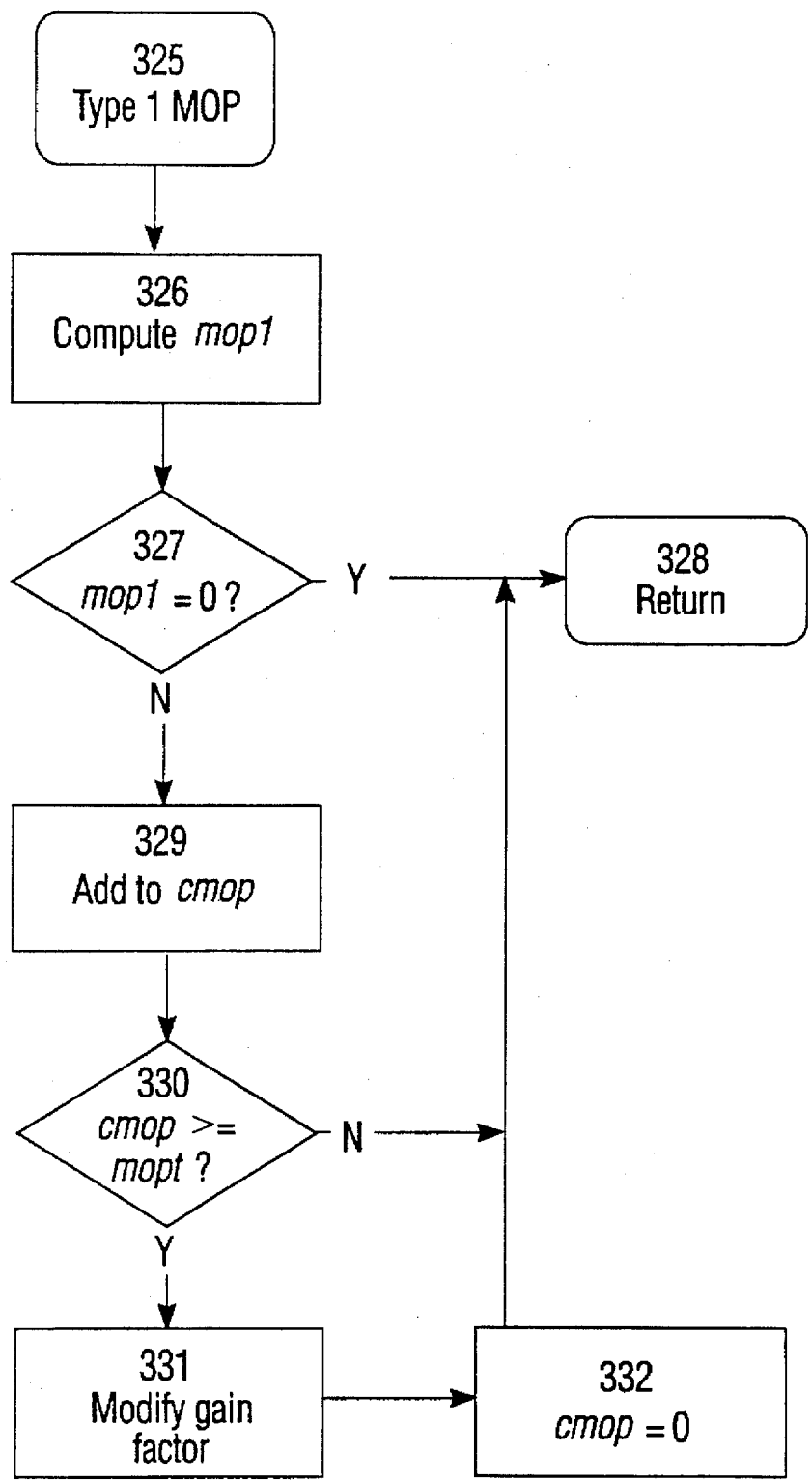
FIG. 11 is a flow chart illustrating the computation of the cumulative missed opportunity penalty and adjustment of the gain factors when the trip level is crossed.

The type 1 missed opportunity penalty mop1 is computed when the access frequency drops below the frequency penalty limit. With reference to FIG. 4, the comparison and calculation would occur as part of step 307. This is shown in more detail in FIG. 11. Step 325 is entered from step 307 of FIG. 4. At step 326, the penalty value mop1 is computed as in Eq. 23. Step 327 tests to see if there was no penalty. If no penalty, step 328 returns back to step 307. If a penalty occurred, step 329 adds this to the cumulative penalty, cmop. At stop 330, the cumulative penalty is compared against the missed opportunity trip level mopt. If the trip level is not exceeded, then step 328 is entered. If the trip level is exceeded, step 311 is entered, wherein the appropriate gain factor is modified. At step 332 the cumulative penalty is cleared, and step 328 is entered.

It is also possible to adjust the gain factors without the explicit use of the missed opportunity penalties. In such a case, the frequency of occurrence of energy/response penalties can be used as a substitute. This works based on the assumption that optimum behavior occurs when there are some occurrences of energy/response penalties. Too low a rate of occurrence indicates the system is not saving enough energy. Therefore, if the rate of occurrence falls below some level, then the gain factors can be modified as if a missed opportunity penalty had occurred.

Of course, it is possible to design other methods for feeding the penalty information back into the threshold frequency computation, but the described embodiment has the advantage of being a very simple design, and providing responsiveness to actual behavior of the system. Other designs include keeping penalty statistics, such as by a histogram, and providing for a time-weighting of the penalties, such as by renormalizing. Further, it may be desirable to provide for the adjustment of other parameters, such as the penalty trip levels, penalty decay rates, penalty magnitude conversion factors (such as in Eq. 14) and the limits on the gain factors. These may be adjusted either through a command from the computer 41, or dynamically when the cumulative penalty trip levels are crossed. It is also desirable to have these various factors be adjusted based on a performance/energy target command as described above.

It may also be desirable for the disk drive to inform the computer of how well it is meeting the specified energy/performance target. Such information can be transferred in a status command, for example. This will allow for the computer to modify the energy/performance target, or inform the user that the target has not been met.

Periodic Accesses

It is also possible to improve the energy savings without impacting performance in the case of periodic accesses. Periodic accesses are quite common. For example, most word processing applications have an "autosave" feature, which stores the current document on the disk drive at a regular interval specified by the user, such as every 10 minutes. If such an access pattern can be detected, then a power-save mode may be entered more quickly, and exited prior to the anticipated access. This will have the effect of hiding the power-save mode recovery time from the user, and saving more energy by entering, the mode sooner than would otherwise be, practical. The access frequency method lends itself naturally to detecting periodic accesses. In this case, the very low frequency (vlf) access behavior is of interest. The vlf activity can be measured from the access density, but with the target frequency range in mind. This would be a range of times longer than the mode recovery times. For detection of autosave activity, a timing window size of a few seconds or more would be appropriate. A history buffer is kept of the vlf activity, for example the last 3 vlf occurrences. If a pattern is detected in the history buffer, then periodic mode is entered. One very simple pattern is that the last 3 vlf values be within some tolerance of each other, perhaps 5%. Once periodic mode is entered, then the gain factors are decreased to enter the power-save modes more quickly, since the assumption is that there would be no performance penalty. The previous values are be saved, as they would be restored when periodic mode is exited. The disk drive returns to the active state when the measured vlf is within some tolerance of the expected vlf. This tolerance is based on the statistical confidence in the vlfvalue, and includes the power-save mode recovery time as well, to insure that the disk drive is ready when the vlf access occurs. Periodic mode is exited when the pattern has not recurred. A simple detection mechanism for exiting periodic mode is when an access does not occur within some tolerance of the predicted vlf, either early or late.

The gain factors and other adjustable parameters may be saved in non-volatile storage, which allows the disk drive to retain its behavior when powered off. This is achieved through the use of semiconductor storage, such as Flash RAM, or by writing the values to the disk. The latter may be done prior to the entry of a power-save mode, for example.

While the preferred embodiments of the present invention have been illustrated in detail, it should be apparent that modifications and improvements my be made to the invention without departing from the spirit and scope of the invention as described in the following claims.

What is claimed is:

1. A method of managing electrical power usage in a data recording disk drive that has a recording disk with data tracks, a plurality of electrically powered components, and a data controller that generates disk drive accesses for the reading and writing of data on the disk, the disk drive components including a spindle motor for rotating the disk, a head for writing data to or reading data from the disk, and an actuator connected to the head for moving the head to different tracks on the disk, the method comprising the steps of:

determining the frequency of read or write accesses from the data controller while the spindle motor is rotating at its operating speed;

storing a plurality of values representing a like plurality of previously determined access frequencies;

computing, from the stored values of previously determined access frequencies, an access threshold frequency while the spindle motor is rotating at its operating speed; and reducing electrical power to at least one of the electrically powered components when the determined access frequency falls below the computed access threshold frequency.

2. The method according to claim 1 further comprising the step of restoring power to the previously power-reduced component in response to a read or write access from the data controller.

3. The method according to claim 1 wherein the step of determining the frequency of accesses comprises estimating the access frequency from the number of accesses occurring in a predetermined time window.

4. The method according to claim 1 wherein the step of computing an access threshold frequency comprises computing an access threshold frequency from the maximum and minimum stored values of previously determined access frequencies.

5. The method according to claim 4 wherein the step of computing an access threshold frequency includes multiplying the maximum and minimum stored values of access frequencies by a predetermined gain factor.

6. The method according to claim 1 further comprising the steps of determining if the accesses are a periodic pattern of accesses that occur at a regular time interval and thereafter restoring power to the power-reduced component prior to the end of said time interval.

7. A method of managing electrical power usage in a data recording disk drive having a recording disk with data tracks, a spindle motor for rotating the disk, a head for writing data to or reading data from the data tracks, a data controller that accesses the head to read and write data, a voice coil motor (VCM) actuator driven by a VCM driver and connected to the head for moving the head to different data tracks and to a nondata parking location, and servo control electronics coupled to the actuator for maintaining the head on a data track during reading or writing of data, the disk drive being capable of operating in a first power-save mode during which the spindle motor is rotating at its operating speed and a second power-save mode during which power to the spindle motor is reduced, the method comprising the steps of:

determining the frequency of read or write accesses while the spindle motor is rotating at its operating speed;

storing a values representing a like plurality of previously determined access frequencies;

computing from the stored values of previously determined access frequencies a first access threshold frequency while the spindle motor is rotating at its operating speed; and when the read or write access frequency is less than the first threshold frequency, reducing power to the VCM driver and the servo control electronics; whereby the disk drive is caused to enter the first power-save mode of operation.

8. The method according to claim 7 further comprising the steps of computing from the stored values of previously determined access frequencies a second access threshold frequency, and reducing power to the spindle motor when the read or write access frequency is less than the second threshold frequency; whereby the disk drive is caused to enter the second power-save mode of operation.

9. The method according to claim 8 wherein the step of reducing power to the spindle motor comprises reducing power to the spindle motor essentially simultaneously with moving the VCM actuator to the parking location; whereby the disk drive is caused to enter its second power-save mode without first entering its first power-save mode.

10. The method according to claim 7 wherein the step of computing a first access threshold frequency comprises computing an access threshold frequency from the maximum and minimum access frequencies in a set of previously determined access frequencies.

11. The method according to claim 10 wherein the step of computing a first access threshold frequency includes multiplying the maximum and minimum access frequencies by a gain factor.

12. The method according to claim 11 further comprising the step of adjusting the gain factor.

13. The method according to claim 12 wherein the step of adjusting the gain factor comprises modifying the gain factor by a performance factor having selectable values within a range, one limit of the range representing maximum disk drive power savings and the other limit of the range representing maximum disk drive performance.

14. A method of managing electrical power usage in a data recording disk drive having a recording disk with data tracks, a spindle motor for rotating the disk, a head for writing data to or reading data from the data tracks, a data controller that accesses the head to read and write data, an actuator connected to the head for moving the head to different data tracks and to a nondata parking location, and servo control electronics coupled to the actuator for maintaining the head on a data track during reading or writing of data, the disk drive being capable of entering and exiting a power-save mode of operation, the method comprising the steps of:

determining the frequency of read or write accesses while the spindle motor is rotating;

storing values of previously determined access frequencies;

computing from the stored values of previously determined access frequencies a first access threshold frequency while the spindle motor is rotating;

entering the power-save mode after the most recent access, the time to power-save mode entry being variable depending on the computed first access threshold frequency;

selecting a performance factor having a range of values, one limit of the range representing maximum disk drive power savings and the other limit of the range representing maximum disk drive performance; and using the selected performance factor to modify the first access threshold frequency computation, whereby the power save mode entry behavior of the disk drive is adjusted by the selected performance factor.

15. The method according to claim 14 wherein the step of computing the access threshold frequency includes use of a gain factor.

16. The method according to claim 15 wherein the step of using the selected performance factor to modify the access threshold frequency computation comprises adjusting the gain factor by multiplying it by the selected performance factor.

17. The method according to claim 14 wherein the actuator is moved to the parking location and power is reduced to the servo control electronics at entry of the power-save mode.

18. The method according to claim 14 wherein the actuator is moved to the parking location and the spindle motor is shut off at entry of the power-save mode.

19. The method according to claim 14 wherein the disk drive is capable of entering and exiting a second power-save mode of operation having power usage less than the first power-save mode, and further comprising the steps of:

computing from the stored values of previously determined access frequencies a second access threshold frequency;

entering the second power-save mode after the most recent access, the time to second power-save mode entry being variable depending on the computed second access threshold frequency and different from said computed first access threshold frequency; and using the selected performance factor to modify the second access threshold frequency computation, whereby the second power-save mode entry behavior of the disk drive is adjusted by the selected performance factor.

20. The method according to claim 19 further comprising the step of causing the disk drive to enter the second power-save mode without first entering the first power-save mode.

21. The method according to claim 14 further comprising the steps of determining if the stored values of access frequencies represent a pattern of periodic read or write accesses and thereafter exiting the power-save mode prior to the next periodic access.

22. A method of managing electrical power usage in a data recording disk drive having a recording disk with data tracks, a spindle motor for rotating the disk, a head for writing data to or reading data from the data tracks, a data controller that accesses the head to read and write data, an actuator connected to the head for moving the head to different data tracks and to a nondata parking location, and servo control electronics coupled to the actuator for maintaining the head on a data track during reading or writing of data, the disk drive being capable of entering and exiting a power-save mode of operation, the method comprising the steps of:

determining the frequency of read or write accesses while the spindle motor is rotating at its operational speed;

storing values of previously determined access frequencies;

computing from the stored values of previously determined access frequencies an access threshold frequency while the spindle motor is rotating at its operational speed;

when the read or write access frequency is less than the access threshold frequency, entering the power-save mode of operation;

detecting the power-save mode entry and exit times;

computing an energy penalty if a power-save mode duration from the detected mode entry and exit times is less than a predetermined energy break-even time, said break-even time being the power-save mode duration required for the disk drive energy savings to be generally equal to the disk drive energy required to exit the power-save mode;

accumulating the computed energy penalties; and modifying the access threshold frequency when the accumulated energy penalties exceed a predetermined trip level, whereby the power-save mode entry behavior of the disk drive is dynamically adjusted from the history of energy penalties.

23. The method according to claim 22 further comprising the steps of:

detecting the times of the read or write accesses;

computing a missed opportunity penalty if the time interval between successive detected access times without power-save mode entry is greater than said energy break-even time;

accumulating the computed missed opportunity penalties; and modifying the access threshold frequency when the accumulated missed opportunity penalties exceed a predetermined trip level, whereby the power-save mode entry behavior of the disk drive is dynamically adjusted from the history of missed opportunity penalties.

24. The method according to claim 22 wherein the step of computing the access threshold frequency includes computing the access threshold frequency from the maximum and minimum access frequencies in a set of stored access frequencies and by use of a gain factor.

25. The method according to claim 24 wherein the step of modifying the access threshold frequency comprises adjusting the gain factor.

26. The method according to claim 22 wherein the actuator is moved to the parking location and power is reduced to the servo control electronics at entry of the power-save mode.

27. The method according to claim 22 wherein the actuator is moved to the parking location and the spindle motor is shut off at entry of the power-save mode.

28. The method according to claim 22 further comprising the step of determining if the accesses are a periodic pattern and thereafter exiting the power-save mode prior to the next periodic access.

* * * * *